United States Patent
Zhang et al.

(10) Patent No.: US 11,115,803 B2
(45) Date of Patent: Sep. 7, 2021

(54) METHOD AND APPARATUS FOR CELLULAR CAPABLE SECONDARY WIRELESS DEVICE COMPATIBILITY WITH MULTI-SIM WIRELESS DEVICE

(71) Applicant: Apple Inc., Cupertino, CA (US)

(72) Inventors: Wanping Zhang, San Jose, CA (US); Faraz Faheem, Santa Clara, CA (US); Jianxiong Shi, Pleasanton, CA (US); Madhusudan Chaudhary, Campbell, CA (US); Sachin J. Sane, Fremont, CA (US); Longda Xing, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/756,671

(22) PCT Filed: Nov. 9, 2018

(86) PCT No.: PCT/US2018/060135
§ 371 (c)(1),
(2) Date: Apr. 16, 2020

(87) PCT Pub. No.: WO2019/094799
PCT Pub. Date: May 16, 2019

(65) Prior Publication Data
US 2020/0267533 A1    Aug. 20, 2020

(30) Foreign Application Priority Data
Nov. 13, 2017   (CN) .......................... 201711116952.X

(51) Int. Cl.
*H04W 48/18*   (2009.01)
*H04W 8/18*    (2009.01)
(Continued)

(52) U.S. Cl.
CPC ............. *H04W 8/183* (2013.01); *H04W 4/16* (2013.01); *H04W 4/80* (2018.02); *H04W 8/205* (2013.01);
(Continued)

(58) Field of Classification Search
None
See application file for complete search history.

(56) References Cited

U.S. PATENT DOCUMENTS

2014/0228039 A1   8/2014   Zhoe et al.
2015/0050952 A1   2/2015   Ponukumati
(Continued)

FOREIGN PATENT DOCUMENTS

WO   2017113654 A1   7/2017

OTHER PUBLICATIONS

PCT Application No. PCT/US2018/060135, International Search Report and Written Opinion dated Feb. 27, 2019, 12 pages.
(Continued)

*Primary Examiner* — Gary Lafontant
(74) *Attorney, Agent, or Firm* — Dickinson Wright RLLP

(57) ABSTRACT

Apparatus and methods to improve compatibility between a primary wireless device including multiple subscriber identity modules (SIMs) and a cellular capable secondary wireless device are disclosed. The cellular capable secondary wireless device pairs with the primary wireless device, which provides a configurable option to allow mobile terminated connections and/or messages to be received at the cellular capable secondary wireless device for multiple SIMs when the cellular capable secondary wireless device is not within proximity of the primary wireless device and is being worn. The primary wireless device indicates conditional forwarding to a second wireless network associated with a second SIM and adjusts notification alerts to reduce
(Continued)

time for forwarding when the cellular capable secondary wireless device is separated from the primary wireless device and in use.

20 Claims, 15 Drawing Sheets

(51) Int. Cl.
    *H04W 76/14*     (2018.01)
    *H04W 4/80*     (2018.01)
    *H04W 76/16*     (2018.01)
    *H04W 4/16*     (2009.01)
    *H04W 8/20*     (2009.01)
    *H04W 68/00*     (2009.01)
    *H04W 88/06*     (2009.01)

(52) U.S. Cl.
    CPC ......... *H04W 68/005* (2013.01); *H04W 76/14* (2018.02); *H04W 76/16* (2018.02); *H04W 88/06* (2013.01)

(56) References Cited

U.S. PATENT DOCUMENTS

2015/0327159 A1* 11/2015 Gude .................... H04W 48/18
                                                             455/434
2017/0094628 A1     3/2017 Miao et al.

OTHER PUBLICATIONS

"Apple Watch 3 Guide, Apple Watch Series 3 Manual Guide and Apple Watch OS 4 Tutorial", Sep. 2017, Retrieved from the Internet: <http://www.applewatch3guide.com/> See pp. 8-9, 11, 16, 24-26.

* cited by examiner

METHOD AND APPARATUS FOR CELLULAR CAPABLE SECONDARY WIRELESS DEVICE COMPATIBILITY WITH MULTI-SIM WIRELESS DEVICE

CROSS-REFERENCE TO RELATED APPLICATIONS

The present application is a national phase of PCT Application No. PCT/US2018/060135, filed Nov. 9, 2018, entitled "METHOD AND APPARATUS FOR CELLULAR CAPABLE SECONDARY WIRELESS DEVICE COMPATIBILITY WITH MULTI-SIM WIRELESS DEVICE," which claims the benefit of Chinese Application No. 201711116952.X filed Nov. 13, 2017, entitled "METHOD AND APPARATUS FOR CELLULAR CAPABLE SECONDARY WIRELESS DEVICE COMPATIBILITY WITH MULTI-SIM WIRELESS DEVICE," the contents of all of which are incorporated by reference herein in their entirety for all purposes.

FIELD

The described embodiments generally relate to wireless communications, including methods and apparatus to improve compatibility between a cellular capable secondary wireless device and a primary wireless device that includes multiple subscriber identity modules (SIMs).

BACKGROUND

Technological advances have led to situations where a user can have multiple different wireless devices available for communication. In addition to a designated primary wireless device, such as a smart phone, a user may also have an additional cellular capable secondary wireless device, such as one or more wearable computing devices that are also capable of conducting wireless communications using one or more different radio access technologies (RATs). The wireless devices, both primary and secondary, can be associated with a common user account, and the user of the wireless devices can originate outgoing communication sessions or receive incoming communication sessions using one or more of the wireless devices alone or in tandem. A user of a wireless device accesses services offered by a wireless network service provider based on service subscriptions controlled by authentication credentials included in a profile, also referred to as a subscriber identity module (SIM), which can be included in a removable universal integrated circuit card (UICC), and/or an electronic SIM (eSIM), which can be included in an embedded UICC (eUICC) of the wireless device. With a removable UICC and an "unlocked" wireless device, a user can access different services by replacing the UICC/SIM combination. Similarly, eSIMs can be installed, activated, deactivated, and uninstalled on the eUICC of a wireless device. Wireless devices that accommodate multiple SIMs and/or eSIMs provide for multiple subscriber identities to be used by the same wireless device to access different services, including different wireless networks depending on the radio access technologies (RATs) supported by the wireless device. Cellular capable secondary wireless devices, such as a cellular capable wearable wireless device, are increasingly available and usable independent of a primary wireless device with which the cellular capable secondary wireless device may be paired. A user may seek to replicate, at least in part, functionality of the multiple SIM (multi-SIM) primary wireless device at the cellular capable secondary wireless device that is paired with the multi-SIM primary wireless device. Thus, there exists a need for methods and apparatus to improve compatibility of between a cellular capable secondary wireless device and a primary wireless device that offers multiple different SIM/eSIM profiles at the same time.

SUMMARY

Methods and apparatus to improve compatibility between a cellular capable secondary wireless device and a primary wireless device that includes multiple subscriber identity modules (SIMs) are disclosed. The multiple SIMs can include any combination of profiles loaded on Universal Integrated Circuit Cards (UICCs) and/or electronic SIMs on an embedded eUICC. Different SIMs/eSIMs can access services for the same wireless network and/or for different wireless networks. The primary wireless device includes a primary SIM/eSIM that provides for access to wireless services of a first wireless service provider via a first cellular wireless network that includes a first radio access network using a first radio access technology and a first core network. The primary wireless device also includes a secondary SIM/eSIM that provides for access to wireless services of a second wireless service provider via a second cellular wireless network that includes a second radio access network using a second radio access technology and a second core network. The cellular capable secondary wireless device is paired with the primary wireless device and includes a first eSIM that corresponds to the primary SIM/eSIM and is active for access services of the first cellular wireless network via the cellular capable secondary wireless device. The cellular capable secondary wireless device accesses services of the first cellular wireless network or the second cellular wireless network via a relayed connection through the primary wireless device when within proximity of the primary wireless device, where proximity includes a direct wireless personal area network (WPAN) or peer-to-peer wireless local area network (WLAN) connection or an indirect WLAN connection via an access point (AP). The cellular capable secondary wireless device accesses services of the first cellular wireless network using the first eSIM when not within proximity of the primary wireless device. The cellular capable secondary wireless device receives page messages and/or mobile terminated connections for the second cellular wireless network via the first cellular wireless network based on conditional forwarding when not within proximity of the primary wireless device and while being used, e.g., while being worn for a wearable device. Conditional forwarding can be established when pairing the cellular capable secondary wireless device with the primary wireless device and/or can be configured via a user interface of the primary wireless device. Incoming connection requests and/or short message service (SMS) text messages for the secondary SIM/eSIM are forwarded conditionally via the first cellular wireless network to the cellular capable secondary wireless device when not accepted by the primary wireless device and/or the primary wireless device is unreachable, e.g., powered down, cellular disabled, and/or in an out of service state. To reduce a time to establish a conditionally forwarded connection for the secondary SIM/eSIM with the cellular capable secondary wireless device, when in use and not in proximity to the primary wireless device, alert notifications at the primary wireless device for page messages from the secondary wireless network can be limited to a threshold number. Additionally, the primary wireless device can suppress alert notifications at the primary wireless device for conditionally forwarded page messages received from the primary wireless network.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
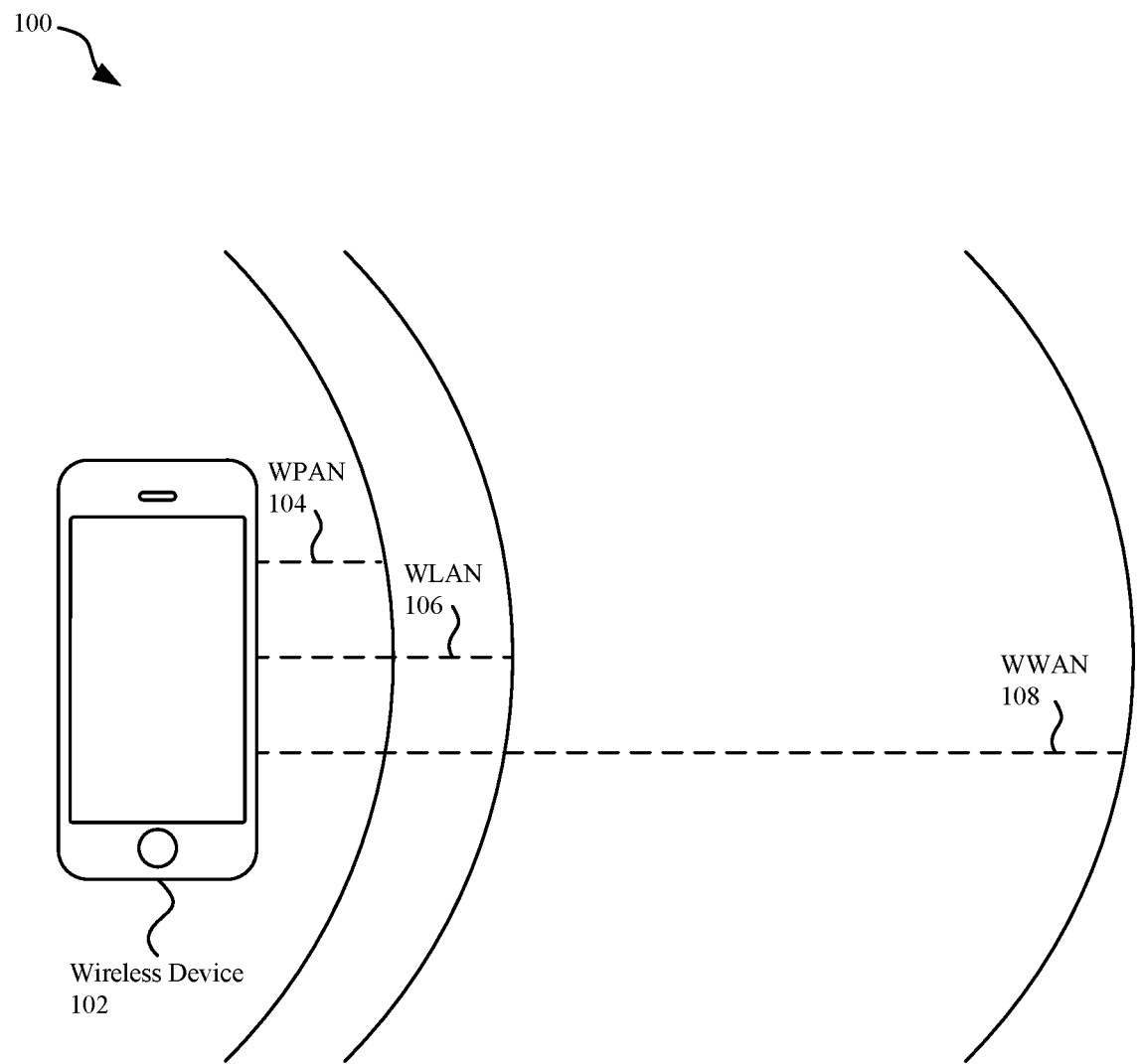
FIG. 1 illustrates in block diagram format a set of overlapping wireless networks for an exemplary wireless device, in accordance with some embodiments.

Representative examples for accessing select wireless services at a cellular capable secondary wireless device using conditional forwarding of page messages by an associated paired primary wireless device configured with multiple active subscriber identity modules (SIMs) and/or electronic SIMs (eSIMs) are provided herein. These examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

References are made in this section to the accompanying drawings, which form a part of the disclosure and in which are shown, by way of illustration, various implementations corresponding to the described embodiments herein. Although the embodiments of this disclosure are described in sufficient detail to enable one having ordinary skill in the art to practice the described implementations, it should be understood that these examples are not to be construed as being overly-limiting or all-inclusive.

Users of wireless devices can seek to access services provided by different cellular wireless network service providers through different cellular wireless networks. A user can obtain and use a variety of UICCs, also referred to as SIM cards, that provide for access to services for different service providers, such as when travelling to regions in which one or more services accessed via a local wireless network provider may be more cost effective than by using roaming services from a home wireless network provider. Use of multiple SIMs (and/or of electronic SIMs, also referred to as eSIMs, of an embedded UICC, also referred to as an eUICC) allows for flexibility and convenience to access a broader variety of services by a primary wireless device. The user may also seek to access services of multiple SIMs/eSIMs at one or more cellular capable secondary wireless devices that are paired with the primary wireless device. A user may mix use of personal and business accounts or different services provided by different wireless service providers by selecting between different SIMs/eSIMs. In some cases, a user may be able to share wireless circuitry of the primary wireless device to allow for reconfiguration to access different wireless networks that use different radio access technologies (RATs). A paired cellular capable secondary wireless device may be configured with one or more eSIMs; however, only one eSIM may be active at a time, in some implementations. While the user can have multiple SIMs/eSIMs active in the primary wireless device, the cellular capable secondary wireless device may have only one active eSIM. When the cellular capable secondary wireless device is within proximity of the primary wireless device, e.g., able to maintain a connection via a wireless personal area network (WPAN), such as Bluetooth®, via a wireless local area network (WLAN), or via a direct peer-to-peer connection, page messages for mobile terminated connections and/or SMS messages can be received at the primary wireless device and relayed to the cellular capable secondary wireless device. When the cellular capable secondary wireless device is not within proximity of the primary wireless device, and is being worn, a user may seek to continue to receive page messages for mobile terminated connections and/or SMS messages at the cellular capable secondary wireless device (such as when not able to access the primary wireless device). As the cellular capable secondary wireless device may have only one eSIM active, which may correspond to a first SIM/eSIM at the primary wireless device, any page messages or SMS messages for additional SIMs/eSIMs of the primary wireless device may be received at the cellular capable secondary wireless device by conditional forwarding from the associated wireless networks of the additional SIMs/eSIMs to the wireless network associated with the first SIM/eSIM. This conditional forwarding, which can be user configurable at the primary wireless device, can allow the user to receive page messages for mobile terminated connections and/or SMS messages at the cellular capable secondary wireless device, even when separated from the primary wireless device and connected directly to a wireless network associated with the first SIM/eSIM.

An example use case for multiple SIMs/eSIMs at a primary wireless device includes a scenario in which a user's region or wireless network provider may lack the capability to port mobile numbers between different wireless devices; and thus, the user may seek to continue to receive connections for two different mobile numbers at a single primary wireless device. Additionally, a user may have a first SIM card (or eSIM), e.g., provided by an employer for business use with a business mobile number, and a second SIM card (or eSIM), e.g., acquired by the user for personal use with a personal mobile number. As the personal mobile number may not be portable to use on the first SIM card, the user may seek to continue to use the second SIM card, as deactivation of the second SIM card can result in loss of contact via the personal mobile number. The user can seek to access services provided by both the first SIM card and the second SIM card at either the primary wireless device or at a paired cellular capable secondary wireless device. The user may seek to access service provided by the second SIM card at the cellular capable secondary wireless device when not in proximity to the primary wireless device (where access to services of the second SIM card may be limited to a subset of services, such as to receiving page messages for incoming connection requests for the second SIM card or to receive SMS messages from the wireless network associated with the second SIM card). Limited access to services of the second SIM card at the cellular capable secondary wireless device may not require access to a radio access network (RAN) of the cellular wireless network used by the wireless network provider associated with the second SIM card and instead may be provided by conditional forwarding of page messages for mobile terminated connections and/or SMS messages to the cellular capable secondary wireless device via the wireless network associated with the first SIM card.

In some embodiments, a user can indicate, via a user interface of the primary wireless device, a preference to receive page messages for mobile terminated connections and/or SMS messages directed to a second SIM/eSIM of the primary wireless device to be conditionally forwarded to a first SIM/eSIM of the primary wireless device when the cellular capable secondary wireless device is not within proximity of the primary wireless device and is being worn. In some embodiments, the primary wireless device provides an indication of the preference for conditional forwarding to a wireless network associated with the second SIM/eSIM in response to a preference indication received via a user interface of the primary wireless device. In some embodiments, when a cellular capable secondary wireless device is not within proximity of the primary wireless device and is being worn (as opposed to not being worn, such as when attached to an external charger or otherwise not in contact with a user), page messages for mobile terminated connections for a second SIM/eSIM can be forwarded from a wireless network associated with the second SIM/eSIM to a wireless network associated with the first SIM/eSIM. Initially page messages for mobile terminated connections for the second SIM/eSIM can be sent by the second wireless network to the primary wireless device, and when no answer occurs at the primary wireless device, the page messages can be forwarded to the wireless network associated with the first SIM/eSIM and can be resent to the primary wireless device as well as sent to the cellular capable secondary wireless device in parallel. In some embodiments, when the primary wireless device is unreachable, such as when in an out of service state, powered down, and/or cellular capability is disabled, the wireless network associated with the second SIM/eSIM can determine that the primary wireless device is unreachable and automatically forward page messages for mobile terminated connections (and/or SMS messages directed to the primary wireless device) to the wireless network associated with the primary SIM/eSIM, which in turn provides the page messages (and/or SMS messages) to the primary wireless device and to the cellular capable secondary wireless device in parallel. In some embodiments, automatic conditional forwarding to a cellular capable secondary wireless device by a wireless network associated with a second SIM/eSIM (of a primary wireless device) to a wireless network associated with a first SIM/eSIM (of the primary wireless device) is based at least in part on a preference indication received at the primary wireless device. In some embodiments, when pairing the cellular capable secondary wireless device to the primary wireless device, an option to provide conditional forwarding can be presented via the user interface of the primary wireless device and a preference can be obtained via the user interface. In some embodiments, a configurable setting for conditional forwarding for the cellular capable secondary wireless device can be accessed after pairing with the primary wireless device. In some embodiments, options for conditional forwarding and/or configurable settings for conditional forwarding are presented and/or available only when a forwarding capability between the wireless networks of the first SIM/eSIM and second SIM/eSIM is available.

In some embodiments, the primary wireless device detects whether the cellular capable secondary wireless device is within proximity and adjusts alert notifications at the primary wireless device when conditional forwarding is configured. When a page message, such as for a mobile terminated connection, for a second SIM/eSIM of the primary wireless device is received and not answered at the primary wireless device, the wireless network associated with the second SIM/eSIM can conditionally forward the page message to a wireless network associated with a first SIM/eSIM of the primary wireless device. The first SIM/eSIM's wireless network can provide a second page message to the primary wireless device and to the cellular capable secondary wireless device based on the conditional forwarding. The primary wireless device, in some embodiments, can suppress alert notifications for the second page message at the primary wireless device, when the first page message was not answered to reduce disruption by repeated alert notifications from the two different wireless networks for the repeated page messages. In some embodiments, when the primary wireless device determines that the cellular capable secondary wireless device is not within proximity of the primary wireless device and is being worn, the primary wireless device can reduce the quantity of alert notifications presented at the primary wireless device for page messages received from a wireless network associated with the second SIM/eSIM to allow for conditional forwarding to occur more rapidly. In some embodiments, the primary wireless device determines whether the cellular capable secondary wireless device is within proximity of the primary wireless device based on whether a WPAN connection and/or a WLAN connection can be established (or is established) between the primary wireless device and the cellular capable secondary wireless device. In some embodiments, the primary wireless device determines a wearing status of the cellular capable secondary wireless device, e.g., whether the cellular capable secondary wireless device is in a worn state, such as on a wrist of or otherwise in contact with a user, based at least in part on indications available from a network accessible server, e.g., from a server associated with a user account that is common to both the primary wireless device and the cellular capable secondary wireless device. In some embodiments, the cellular capable secondary wireless device can provide an indication of a wearing status (e.g., worn or not worn) to the primary wireless device when within proximity of the primary wireless device. In some embodiments, the primary wireless device infers the wearing status of the cellular capable secondary wireless device based on a most recently received indication of a wearing status, e.g., while proximity exists between the primary wireless device and the cellular capable secondary wireless device. In some embodiments, when the cellular capable secondary wireless device is not within proximity of the primary wireless device, and responsive to receipt of a page message from a wireless network associated with the second SIM/eSIM, the primary wireless device can provide a negative indication (e.g., declining answer to a page request or indicating unavailability for terminating the connection at the primary wireless device) to the wireless network associated with the second SIM/eSIM to cause forwarding to occur more rapidly.

In some embodiments, the primary wireless device determines the second page message is conditionally forwarded based on an indication provided in the second page message received from the wireless network associated with the first SIM/eSIM. For example, for a Voice over Long Term Evolution (VoLTE) connection request, a SIP invite message from a first wireless network (associated with the first SIM/eSIM) can include information that indicates the connection request is for a forwarded connection request from a second wireless network (associated with the second SIM/eSIM). The primary wireless device can parse the SIP invite message from the first wireless network to determine whether the VoLTE connection request is for a forwarded connection request from the second wireless network, and when the SIP invite message corresponds to a forwarded connection request, alert notifications at the primary wireless device can be suppressed. For example, audible ringing and/or visual alerts can be reduced in quantity and/or muted. In some embodiments, when the first wireless network (associated with the first SIM/eSIM) operates in accordance with a non-LTE wireless communication protocol, e.g., using a 2G or 3G wireless communication protocol, and the first wireless network supports use of a supplemental service notification (e.g., a NotifySS field) in the page message, the primary wireless device parses the page message received from the first wireless network to determine whether the page message is for a conditionally forwarded connection request and adjusts alert notifications at the primary wireless device accordingly. In some embodiments, when the first wireless network is a non-LTE wireless network and does not support supplemental service notification, the primary wireless device can parse the page message to determine a caller identification (ID) field to ascertain whether the page message from the first wireless network (associated with the first SIM/eSIM) uses the same caller ID as a recently received page message from the second wireless network (associated with the second SIM/eSIM). When two page messages having the same caller ID are received from two different wireless networks within a predetermined period of time, e.g., within a continuous time period of a few seconds, the primary wireless device can adjust alert notifications at the primary wireless device, when the cellular capable secondary wireless device is not within proximity of the primary wireless device and is in a worn state.

Conditional forwarding of page messages for mobile terminated connection requests and/or SMS messages can be configured via a user interface of the primary wireless device when pairing with the cellular capable secondary wireless device or afterwards, e.g., via configuration settings accessible via the user interface of the primary wireless device. For example, page messages and/or SMS text messages from a second wireless network for a second SIM/eSIM of the primary wireless device can be conditionally forwarded by the second wireless network to a first wireless network associated with a first SIM/eSIM of the primary wireless device, where a corresponding first eSIM is active in the cellular capable secondary wireless device paired with the primary wireless device. When changes to SIMs in the primary wireless device and/or in the cellular capable secondary wireless device occur, a previously established conditional forwarding relationship may require updating. Upon installation of a different UICC that includes a different SIM in the primary wireless device or when installing and/or activating a different eSIM on an eUICC of the primary wireless device, notifications may be provided via the user interface of the primary wireless device to indicate options for updating and/or establishing a conditional forwarding relationship between the newly installed/activated SIM/eSIM and another SIM/eSIM of the primary wireless device. In some embodiments, when a SIM/eSIM is uninstalled and/or deactivated on the primary wireless device, a notification may be provided via a user interface of the primary wireless device indicating to the user that a previously conditional forwarding relationship should be removed. In some embodiments, the conditional forwarding relationship is automatically removed, while in some embodiments, manual removal may be required. In some embodiments, when a SIM/eSIM is installed/activated on the primary wireless device, a previously established conditional forwarding relationship between two SIMs/eSIMs of the primary wireless device is updated automatically. In some embodiments, when a SIM/eSIM is installed/activated, a notification is presented via a user interface of the primary wireless device to indicate that a previously established conditional forwarding relationship must be updated manually, e.g., by requesting a user to confirm a suggested conditional forwarding relationship or to enter a conditional forwarding relationship between the newly installed/activated SIM/eSIM and another SIM/eSIM of the primary wireless device.

An exemplary multiple SIM/eSIM wireless device can include (i) dual removable UICCs, e.g., each UICC including at least one SIM, or (ii) a single removable UICC including at least one SIM and an eUICC including at least one eSIM, or (iii) an eUICC including two or more eSIMs. Via a user interface of the multiple SIM/eSIM wireless device, which can serve as a primary wireless device, a corresponding eSIM for one of the multiple SIMs/eSIMs of the primary wireless device can be installed/activated in a cellular capable secondary wireless device. In some embodiments, multiple eSIMs can be installed in the cellular capable secondary wireless device, but only one eSIM can be active at any given time. When the cellular capable secondary wireless device is within proximity of the primary wireless device, page messages for mobile terminated connections and/or SMS messages for any active SIM/eSIM at the primary wireless device can be relayed to the cellular capable secondary wireless device via a local connection between the primary wireless device and the cellular capable secondary wireless device, e.g., via a WPAN connection (e.g., Bluetooth), via a WLAN connection (e.g., Wi-Fi), or via a peer-to-peer connection. When the cellular capable secondary wireless device is not within proximity of the primary wireless device, e.g., when a local connection cannot be established and/or maintained between the cellular capable secondary wireless device and the primary wireless device, the cellular capable secondary wireless device can be associated with (e.g., camped on) a radio access network of a wireless network associated with an active eSIM of the cellular capable secondary wireless device, which can correspond to one of the SIMs/eSIMs of the primary wireless device. Conditional forwarding of page messages for mobile terminated connections for a second SIM/eSIM of the primary wireless device (i.e., a SIM/eSIM that does not correspond to the active eSIM of the cellular capable secondary wireless device) can allow for page messages to be received at the cellular capable secondary wireless device through the radio access network of the wireless network associated with the active eSIM. A user of both the primary wireless device and the cellular capable secondary wireless device can receive mobile terminated connection requests for either of two different SIMs/eSIMs at both the primary wireless device and at the cellular capable secondary wireless device, including when the cellular capable secondary wireless device is not in proximity to the primary wireless device. The conditional forwarding from a second wireless network associated with a second SIM/eSIM (for which a corresponding eSIM is not installed or active in the cellular capable secondary wireless device) to a first wireless network associated with a first SIM/eSIM (for which a corresponding eSIM is installed and active in the cellular capable secondary wireless device) provides flexibility in use of multiple SIMs on both the primary wireless device and the cellular capable secondary wireless device, without requiring multiple active eSIMs in the cellular capable secondary wireless device.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments the disclosure. In accordance with various implementations, any one of these consumer electronic devices may relate to: a cellular phone or a smart phone, a tablet computer, a laptop computer or a netbook computer, a media player device, an electronic book device, a MiFi® device, a wearable computing device, as well as any other type of electronic computing device having fourth generation (4G) Long Term Evolution (LTE) and LTE Advanced (LTE-A), fifth generation (5G) new radio (NR), or similar "later generation" cellular wireless access communication capabilities.

Additionally, it should be understood that the UEs described herein may be configured as multi-mode wireless devices that are also capable of communicating via legacy third generation (3G) and/or second generation (2G) RATs in addition to communicating with 4G wireless networks, as well as communicating using one or more different wireless local area networks. Multi-mode UEs can include support for communication in accordance with one or more different wireless communication protocols developed by standards bodies, e.g., 3GPP's Global System for Mobile Communications (GSM), Universal Mobile Telecommunications System (UMTS), LTE, LTE-A, and 5G NR standards or 3GPP2's CDMA2000 (1×RTT, 2×EV-DO, HRPD, eHRPD) standards. Multi-mode UEs can also support communication using wireless local area networking protocols, e.g., the Institute of Electrical and Electronics Engineers (IEEE) 802.11 (Wi-Fi), IEEE 802.16 (WiMAX), and wireless personal area networking protocols, e.g., Bluetooth®. Multiple wireless communication protocols can provide complementary functions and/or different services for a multi-mode UE.

FIG. 1 illustrates a block diagram 100 of a set of overlapping wireless networks for a wireless device 102. The wireless device 102 can include a combination of hardware and software to provide wireless connections using one or more different wireless networks alone, separately, or in combination, such as via the set of overlapping networks. The wireless device 102 can represent a device having wireless communications capabilities, such as a smart phone (e.g., an iPhone®), a tablet device (e.g., an iPad®), a wearable device (e.g., an Apple Watch™), a portable media player (e.g., an iPod®), a laptop computer (e.g., a MacBook®), or a desktop computer (e.g., an iMac®), among other possible devices. Additional wireless devices, which can connect to the wireless device 102 and provide audio, video, and/or data media interfaces can include a wireless headset, a vehicle sound system, a digital television, a digital media recorder, a wearable computing device or any other suitable wireless device capable of wireless communication and input/output capabilities.

The wireless device 102 can include a combination of hardware, software, and/or firmware to provide communication using a wireless personal area network (WPAN) 104, which can provide power efficient connections while operating over a limited distance. WPAN connections can typically provide for connecting the wireless device 102 to peripheral and associated wireless devices, such as headsets, earpieces, supplemental display devices, and supplemental input/output devices, for example. WPAN connections can also be used to relay communication between the wireless device 102 and a paired secondary wireless device through which the user can interact for a communication session. A representative WPAN 104 can operate in accordance with a communication protocol, such as Bluetooth® specified by the Bluetooth SIG and/or an Apple Wireless Direct Link (AWDL) specified by Apple. The wireless device 102 can also include a combination of hardware, software, and/or firmware to provide communication using a wireless local area network (WLAN) 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. The wireless device 102 can also include additional hardware, software, and/or firmware to provide a wireless wide area network (WWAN) 108 capability, such as to interconnect with one or more cellular wireless networks. The wireless device 102 can provide a multitude of services using one or more connections through its wireless networking capabilities. As described further herein, a primary wireless device can include WWAN 108 capability, while a cellular capable secondary wireless device can also include WWAN 108 capability, in addition to both wireless devices providing WLAN 106 and/or WPAN 104 communication capabilities. The cellular capable secondary wireless device can communicate indirectly with a remote device via a WLAN 106 connection or a WPAN 104 connection relayed through the primary wireless device or directly with a remote device via a WWAN 108 connection. Local connections, e.g., WLAN 106 connections and/or WPAN 104 connections can provide more power efficient connections over shorter distances and thus can be preferred over WWAN 108 connections for a cellular capable secondary wireless device to preserve battery power, e.g., in a wearable wireless device. The cellular capable secondary wireless device can prefer to use WPAN 104 connections and/or WLAN 106 connections relayed access to communication services through a paired primary wireless device when within proximity of the primary wireless device, while a WWAN 108 connection may be used when not within proximity of the primary wireless device.

Figure 2A:
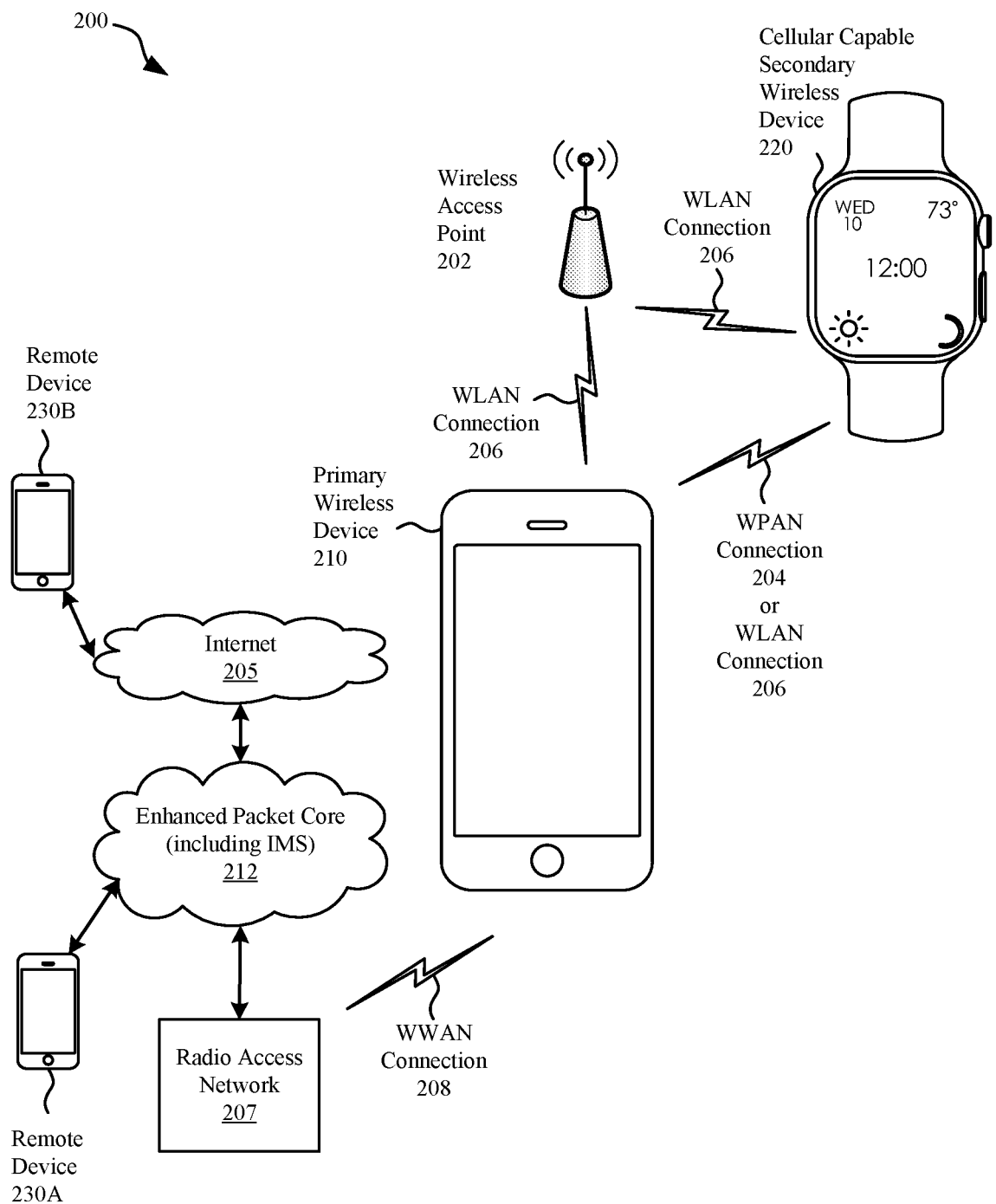
FIG. 2A illustrates in block diagram format a wireless wide area network relayed connection between a cellular capable secondary wireless device and a remote device through a primary wireless device via a non-cellular wireless network and a cellular wireless network, in accordance with some embodiments.

FIG. 2A illustrates a block diagram 200 of a relayed WWAN connection 208 between a cellular capable secondary wireless device 220 and a remote device 230A or 230B through a primary wireless device 210 via a local non-cellular wireless network, e.g., via a WLAN connection 206 through wireless AP 202, via a WPAN connection 204, or via a direct WLAN connection 206 between the primary wireless device 210 and the cellular capable secondary wireless device 220. The relayed connection also includes a wireless wide area network connection 208 between the primary wireless device 210 and a cellular wireless network that includes a radio access network 207 and an enhanced packet core network 212 connected to the Internet 205. Note that while the enhanced packet core network 212 corresponds to a Long Term Evolution (LTE) network, a WWAN relayed connection can be realized in which the cellular capable secondary wireless device 220 connects through the primary wireless device 210 connects via a WWAN connection 208 to a radio access network 207 of a non-LTE wireless network. Communication via WWAN relayed connections by the cellular capable secondary wireless device 220 is not restricted to use via an LTE wireless network. The primary wireless device 210 can serve as an anchor for a connection to the remote device 230A or 230B and relay audio, video, data, messaging, media, or other applicable communication packets to the cellular capable secondary wireless device 220. The relayed connection can use either the WLAN connection 206 (via wireless AP 202 or directly) or the WPAN connection 204 to extend the connection between the primary wireless device 210 and the remote device 230A or 230B to the cellular capable secondary wireless device 220. The WPAN connection 204 can provide limited range, while the WLAN connections 206, either through the wireless access point (AP) 202 or directly, can provide a wider range (as well as higher throughput) for local connection between the primary wireless device 210 and the cellular capable secondary wireless device 220. Communication to and from remote device 230A or 230B can traverse a core network, e.g., an enhanced packet core network 212, which can include an IMS network element, and in some cases also traverse the Internet 205. Packets for a communication session can be managed by the IMS network element and/or by a network-based server knowledgeable of associations between the primary wireless device 210 with the cellular capable secondary wireless device 220, e.g., by an iCloud® server. Relayed connections via the primary wireless device 210 can be preferred to direct cellular wireless connections to the cellular capable secondary wireless device 220 when relayed connections are available, as the shorter distance for local communication between the cellular capable secondary wireless device 220 and the primary wireless device 210 can consume less battery power than longer distance direct cellular wireless connections.

Figure 2B:
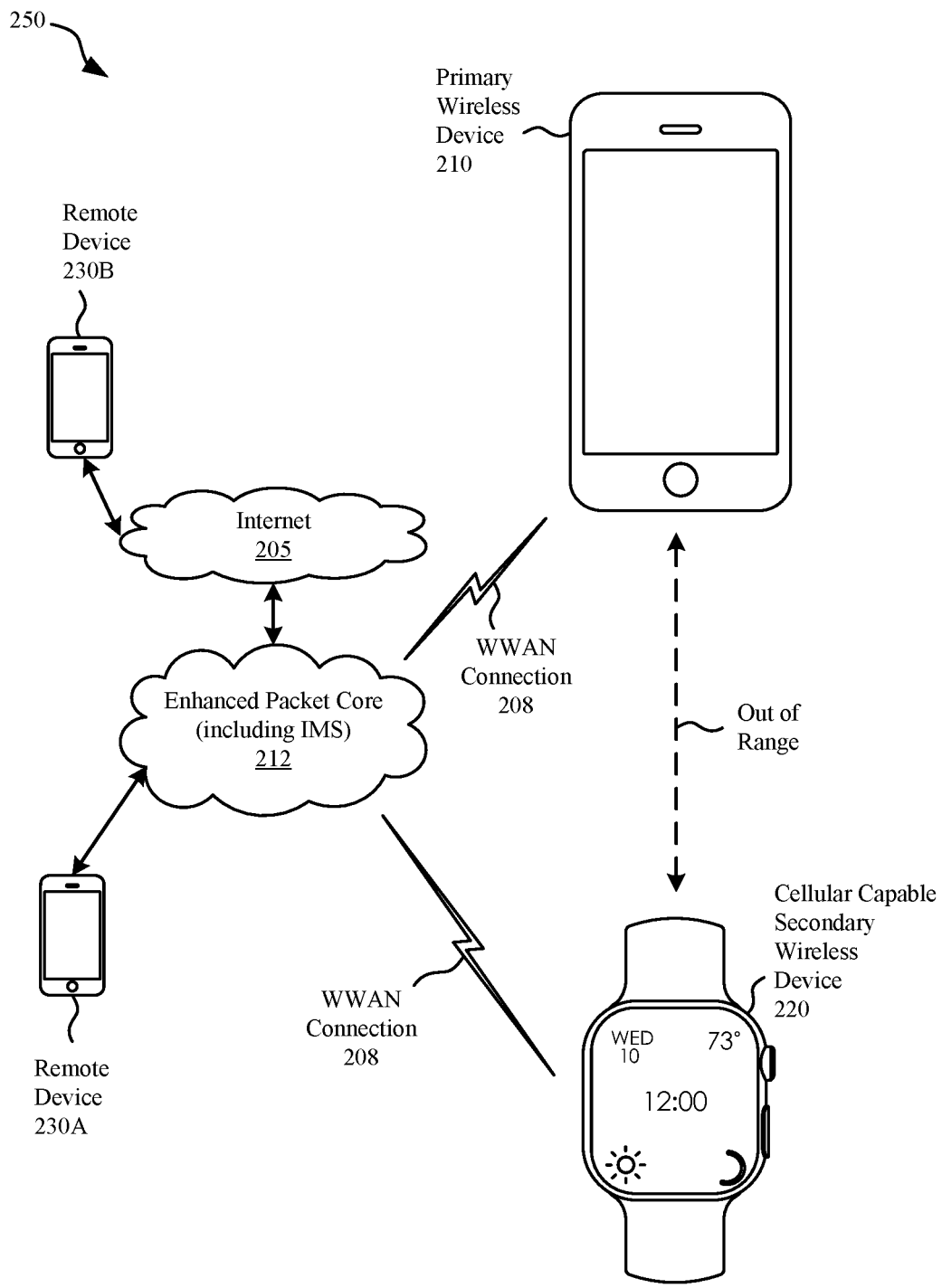
FIG. 2B illustrates in block diagram format a wireless wide area network direct connection between a cellular capable secondary wireless device and a remote device via a cellular wireless network, in accordance with some embodiments.

FIG. 2B illustrates a block diagram 250 of a direct WWAN connection 208 between a cellular capable secondary wireless device 220 and a remote device 230A or 230B, where the direct WWAN connection 208 may be used when the cellular capable secondary wireless device 220 is out of range of the primary wireless device 210 and the cellular wireless network allows the cellular capable secondary wireless device 220 to camp on, attach to, and/or establish a connection with the cellular wireless network. The direct WWAN connection 208 for the cellular capable secondary wireless device 220 can provide for packet-switched voice services, such as Voice over Internet Protocol (VoIP) or Voice over Long Term Evolution (VoLTE) and for packet-switched data services to the remote device 230A or 230B. The cellular capable secondary wireless device 220 (and a user thereof) can be mobile, e.g., the user of the cellular capable secondary wireless device 220 can move and thereby change position with respect to the primary wireless device 210, which can provide relayed connections that use shorter distance local connections as illustrated in FIG. 2A. When within proximity (within local wireless connectivity range) of the primary wireless device 210, the cellular capable secondary wireless device 220 can use local connections, e.g., WPAN connections 204 and/or WLAN connections 206, to the primary wireless device 210. When not within proximity (out of local wireless connectivity range) of the primary wireless device 210, the cellular capable secondary wireless device 220 may communicate via a WWAN connection 208, when permitted to establish the WWAN connection 208. In some embodiments, a maximum number (e.g., one or a predetermined limit set by a wireless service provider) of cellular capable secondary wireless devices 220 associated with the primary wireless device 210 can be allowed to establish WWAN connections 208 at any given time. In some embodiments, a network server, which can include an IMS registration server of the enhanced packet core network 212, can obtain status information for cellular capable secondary wireless devices 220 associated with the primary wireless device 210, e.g., via communication sent by (or retrieved from) the primary wireless device 210. The primary wireless device 210 can provide information about whether one or more of a set of cellular capable secondary wireless devices 220 is active (in use) or inactive (not in use). In some embodiments, the primary wireless device 210 provides information indicating a change in status, e.g., from active to inactive or vice versa, for a cellular capable secondary wireless device 220, and the network server changes a registration status of the cellular capable secondary wireless device 220, e.g., to allow (when active) or to disallow (when inactive) camping on, attachment to, or establishment of connections with the cellular wireless network.

Figure 3:
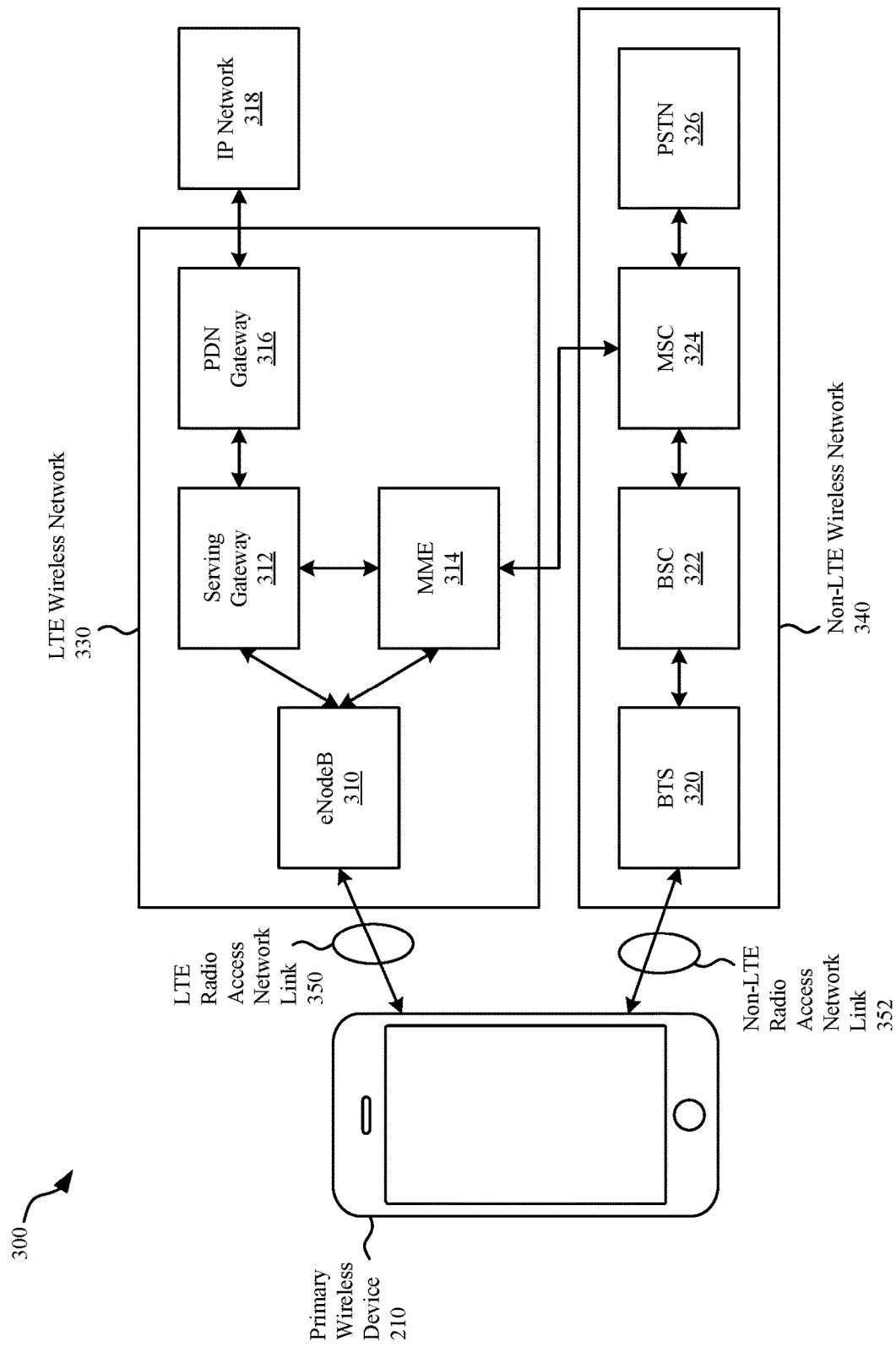
FIG. 3 illustrates an example of a dual subscriber identity module (SIM) wireless device connected in parallel with two wireless networks, in accordance with some embodiments.

FIG. 3 illustrates a diagram 300 of a primary wireless device 210 in communication with an LTE wireless network 330, which can also be an LTE-A or 5G next generation cellular wireless network, and a non-LTE wireless network 340, e.g., a legacy 2G GSM or 3G UMTS wireless network. The primary wireless device 210 can be configured to communicate via an LTE radio access network (RAN) link 350 to an eNodeB 310 in the RAN of the LTE wireless network 330 and separately to communicate via a non-LTE RAN link 352 to a base transceiver station (BTS) 320 connected to a base station controller (BSC) 322, which together can form a base station subsystem, in the RAN of the non-LTE wireless network 340. The LTE wireless network 330 can connect to an Internet Protocol (IP) network 318 via a Packet Data Network (PDN) gateway 316 that communicates with a serving gateway 312 to which the eNodeB 310 of the RAN of the LTE wireless network 330 communicates. The eNodeB 310 also interacts with a Mobility Management Entity (MME) 314 for controlling access to services for the primary wireless device 210 on the LTE wireless network 330. The non-LTE wireless network 340 can connect to a circuit-switched based public switched telephone network (PSTN) 326 through a mobile switching center (MSC) 324. The non-LTE wireless network 340 can provide circuit-switched services, e.g., circuit-switched voice connections for the primary wireless device 210, such as used in a circuit-switched fallback (CSFB) procedure when the LTE wireless network 330 does not support a voice over LTE (VoLTE) service. The non-LTE wireless network 340 can also provide services when access to the LTE wireless network 330 is not available, e.g., where radio frequency coverage of the LTE wireless network 330 is weaker. The MSC 324 of the non-LTE wireless network 340 can be interconnected to the MME 314 of the LTE wireless network 330 to coordinate call signaling for the primary wireless device 210.

FIG. 3 illustrates a representative interconnection between wireless networks, such as the non-LTE wireless network 340 and the LTE wireless network 330 to provide for coordination of wireless services between them. Wireless service providers typically deploy newer technology wireless networks, e.g., the LTE wireless network 330, overlaying older technology wireless networks, e.g., the non-LTE wireless network 340, and the primary wireless device 210 can be configured to communicate with either wireless network. For a multi-SIM version of the primary wireless device 210, with sufficient wireless circuitry, such as when the primary wireless device 210 includes dual transceivers, or with software configurable switchable transceivers, the multi-SIM version of the primary wireless device 210 can be configured to communicate with two different wireless networks. Multi-SIM wireless devices provide for flexibility in accessing services of multiple wireless networks, such as to use different service accounts or to select specific wireless networks for particular services.

Figure 4A:
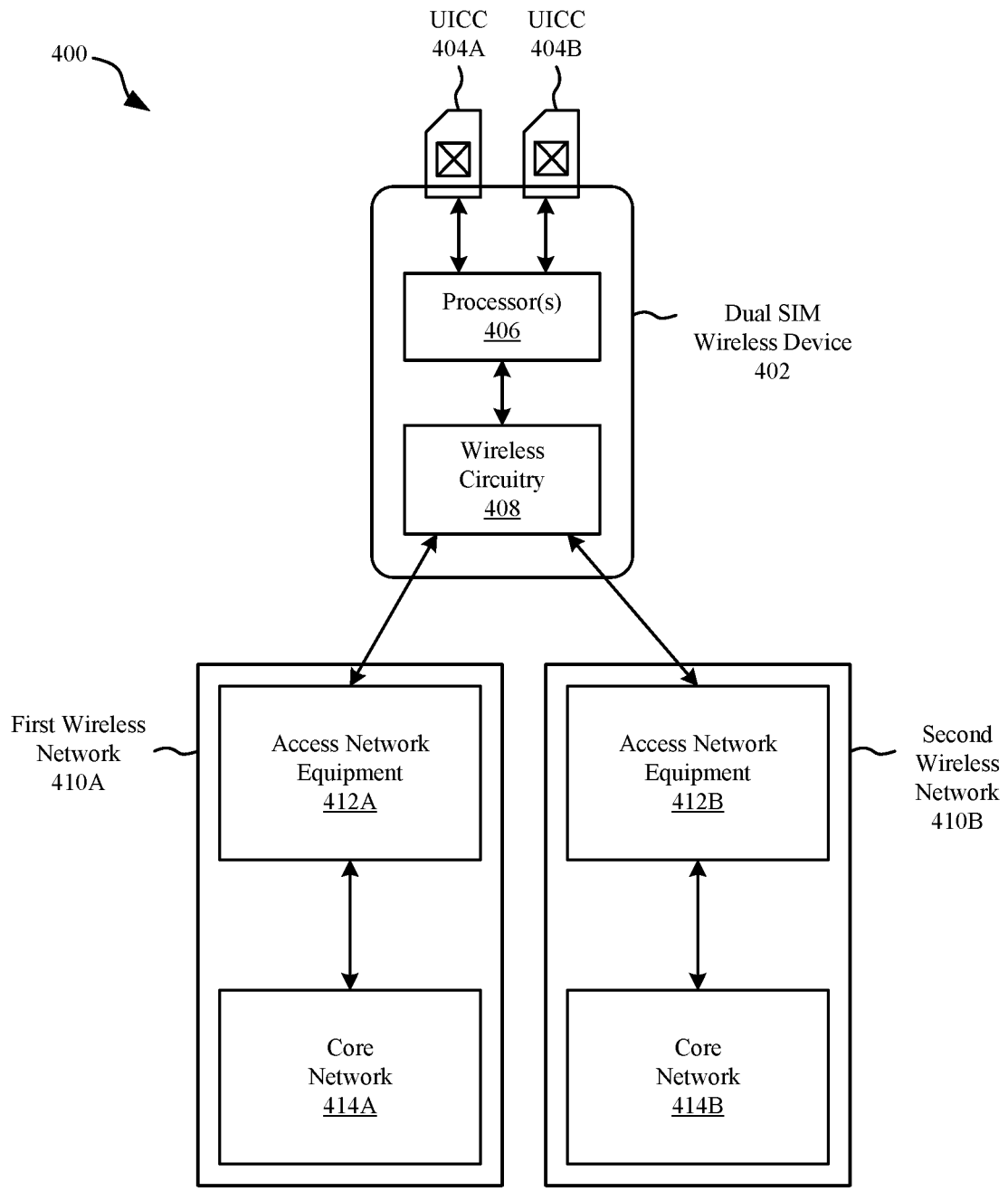
FIG. 4A illustrates another example of a dual subscriber identity module (SIM) wireless device connected in parallel with two wireless networks, in accordance with some embodiments.

FIG. 4A illustrates a diagram 400 of components of a dual SIM wireless device 402 including one or more processor(s) 406 and wireless circuitry 408 that provides for wireless radio frequency (RF) connections between the dual SIM wireless device 402 and a first wireless network 410A and a second wireless network 410B. In some embodiments, the wireless circuitry 408 includes one or more baseband processor(s), and a set of RF analog front-end circuitry. In some embodiments, the wireless circuitry 408 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 408 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more of the first and second wireless networks 410A/B.

The processor(s) 406 and the wireless circuitry 408 can be configured to perform and/or control performance of one or more functionalities of the dual SIM wireless device 402, in accordance with various implementations. The processor(s) 406 and the wireless circuitry 408 can provide functionality for coordinating hardware/software resources in the dual SIM wireless device 402 to provide for connections to one or more of the wireless networks 410A/B. The processor(s) 406 may include multiple processors of different types that can provide for both wireless communication management and/or higher layer functions, e.g., one or more of the processor(s) 406 may be configured to perform data processing, application execution, and/or other device functions according to one or more embodiments of the disclosure. The dual SIM wireless device 402, or portions or components thereof, such as processor(s) 406, can include one or more chipsets, which can respectively include any number of coupled microchips thereon.

In some embodiments, the processor(s) 406 may be configured in a variety of different forms. For example, the processor(s) 406 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 406 of the dual SIM wireless device 402 can be coupled to and/or configured in operative communication with each other, and these components may be collectively configured to perform mobility management functions associated with multiple subscriber identities associated with wireless services provided via multiple wireless networks. In some implementations, the processor(s) 406 can be configured to execute instructions that may be stored in memory, or that can otherwise be accessible to the processor(s) 406 in some other device memory. As such, whether configured as, or in conjunction with, hardware or a combination of hardware and software, the processor(s) 406 may be capable of performing operations according to various implementations described herein, when configured accordingly. In various embodiments, memory in the dual SIM wireless device 402 may include multiple memory devices that can be associated with any common volatile or non-volatile memory type. In some scenarios, the memory may be associated with a non-transitory computer-readable storage medium that can store various computer program instructions, which may be executed by the processor(s) 406 during normal program executions. In this regard, the memory can be configured to store information, data, applications, instructions, or the like, for enabling the dual SIM wireless device 402 to carry out various functions in accordance with one or more embodiments of the disclosure. In some implementations, the memory may be in communication with, and/or otherwise coupled to, the processor(s) 406, as well as one or more system buses for passing information between and amongst the different device components of the dual SIM wireless device 402.

The dual SIM wireless device 402 illustrated in FIG. 4A includes two removable UICCs 404A/B, which can be inserted and removed from the dual SIM wireless device 402 together or independently. Each UICC 404A/B includes at least one subscriber identity module (SIM), which can be embodied as a software/firmware program installed on the UICC 404A/B. Removable UICCs 404A/B can provide a user of the dual SIM wireless device 402 the ability to replace a UICC to change services, provided the dual SIM wireless device 402 supports such flexibility (e.g., an "unlocked" device that is not "locked" to a particular wireless network operator or service provider). Hardware complexity and/or a size of a dual SIM wireless device 402 can limit the ability to include multiple UICC slots, and thus additional arrangements for the dual SIM wireless device 402 are illustrated further herein in FIG. 4B to include multiple SIMs on a single UICC and/or electronic SIMs (eSIMs) on an embedded UICC or combinations thereof. For simplification herein, the term "dual SIM wireless device" may refer additionally to wireless devices that include multiple SIMs and/or eSIMs in various combinations. Similarly, the term "multi-SIM wireless device" refers to a wireless device that includes multiple SIMs and/or eSIMs.

The dual SIM wireless device 402, in some embodiments, can register with two different wireless networks, e.g., the first and second wireless networks 410A/B, simultaneously. The wireless circuitry 408 of the dual SIM wireless device 402 can be configured to register with and/or establish a connection with the first wireless network 410A via access network equipment 412A, which interfaces with a core network 414A. The wireless circuitry 408 of the dual SIM wireless device 402 can also be configured to register with and/or establish a connection with the second wireless network 410B via access network equipment 412B, which interfaces with a core network 414B. In some embodiments, the wireless circuitry 408 of the dual SIM wireless device 402 supports simultaneous transmission and reception to both the first and second wireless networks 410A/B. In some embodiments, the wireless circuitry 408 of the dual SIM wireless device 402 supports transmission and reception to only one of the first and second wireless networks 410A/B at a time. In some embodiments, the wireless circuitry 408 of the dual SIM wireless device 402 supports transmission to only one of the first and second wireless networks 410A/B at a time and reception from one or both of the first and second wireless networks 410A/B. As the dual SIM wireless device 402 can register with two different wireless networks simultaneously via two different subscriptions, the dual SIM wireless device 402 can appear as two distinct devices (each associated with a different number, user, and/or subscription). A dual SIM wireless device 402 that can connect to only one wireless network at a time but can monitor and/or receive communication from two wireless networks with which it is registered can be referred to as a "Dual SIM, Dual Standby" (DSDS) wireless device 402. A dual SIM wireless device 402 that can connect to two wireless networks simultaneously using two different subscriber identities can be referred to as a "Dual SIM, Dual Active" (DSDA) wireless device 402. In general the dual SIM wireless device 402 can be referred to as a "DSDx" wireless device 402, where "x" can indicate either "S" for "standby" or "A" or "active".

It should be appreciated that not all of the components, device elements, and hardware illustrated in and described with respect to the dual SIM wireless device 402 of FIG. 4A may be essential to this disclosure, and thus, some of these items may be omitted, consolidated, or otherwise modified within reason. Additionally, in some implementations, the subject matter associated with the dual SIM wireless device 402 can be configured to include additional or substitute components, device elements, or hardware, beyond those depicted within the illustrations of FIG. 4A.

Figure 4B:
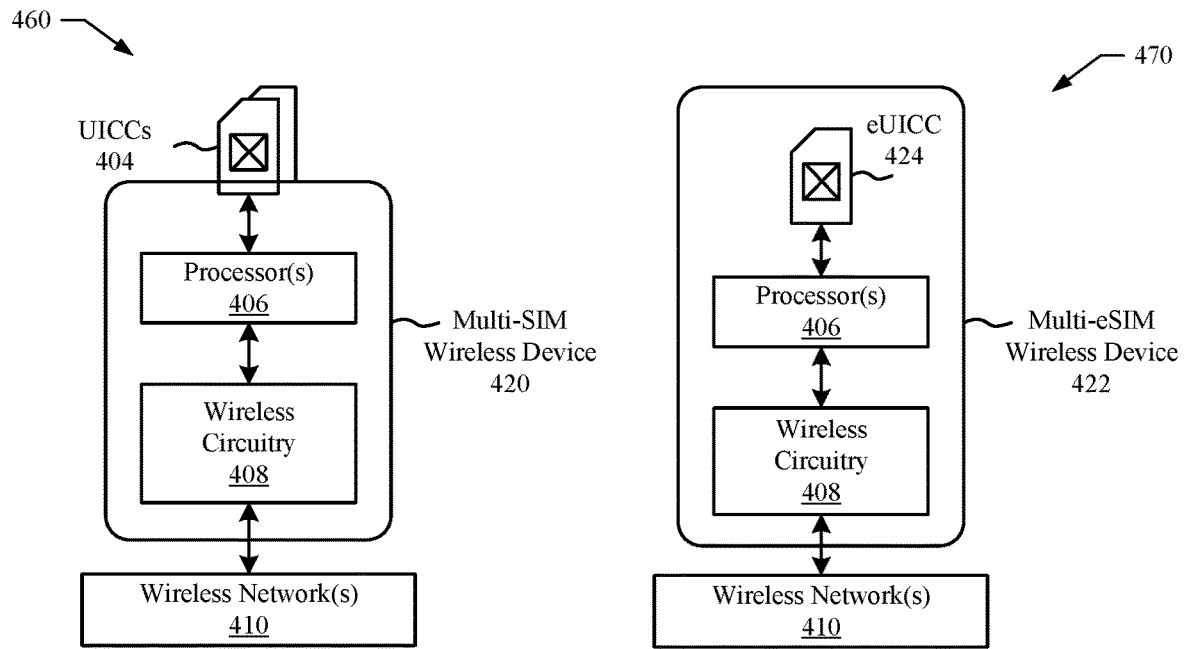
FIG. 4B illustrates examples of wireless devices that support multiple subscriber identities, in accordance with some embodiments.
Figure 4B:
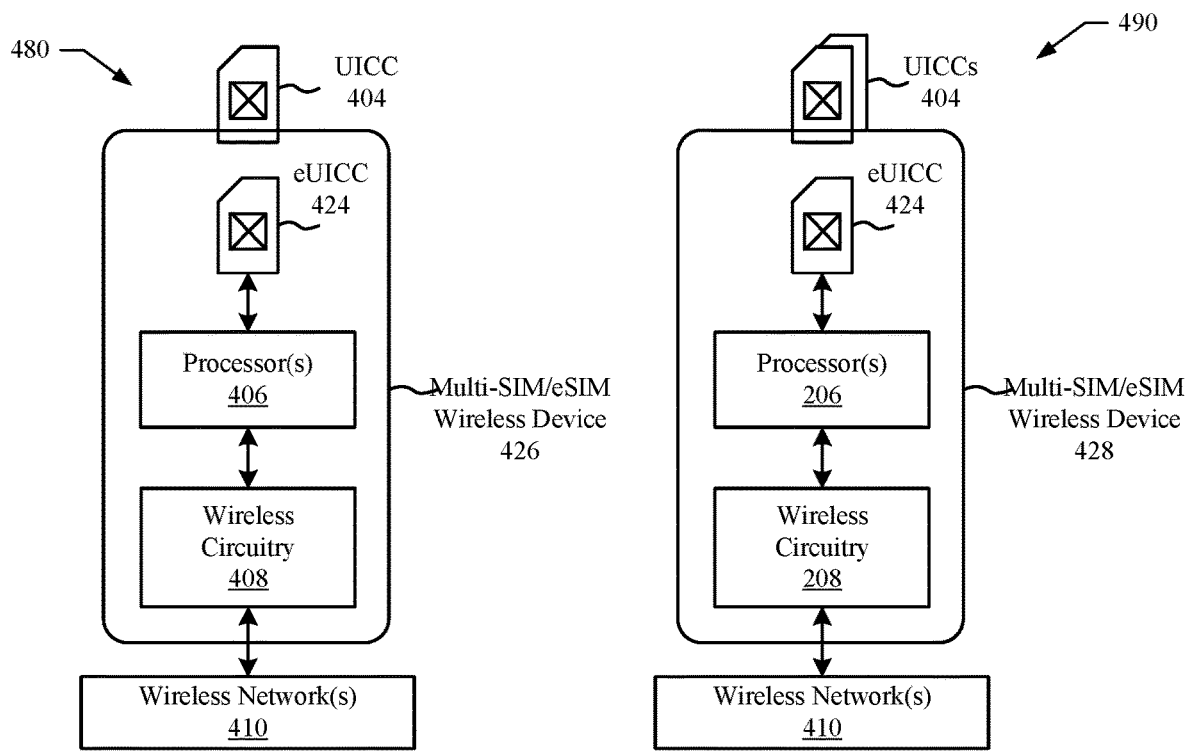

FIG. 4B illustrates diagrams of additional wireless devices that support multiple subscriber identities using removable UICCs and/or embedded UICCs (eUICCs) with SIMs and/or eSIMs implemented thereon. As illustrated in diagram 460, a multi-SIM wireless device 420 includes multiple UICCs 404, which can be inserted and removed individually or together, and communicate with one or more processors 406 that connect to wireless circuitry 408 that provides for wireless communication with one or more wireless networks 410. As the physical size and design of the multi-SIM wireless device 420 can limit the number of UICCs 404 that can be supported, alternatively, as illustrated in diagram 470, a multi-eSIM wireless device 422 can include an embedded UICC (eUICC) 424 connected with the processor(s) 406 and to the wireless network(s) 410 via the wireless circuitry 408. The eUICC 424 can be built into the multi-eSIM wireless device 422 and can be not removable from the multi-eSIM wireless device 422, e.g., permanently affixed to a circuit board in the multi-eSIM communication device 422. The eUICC 424 can be programmed such that one or more electronic SIMs (eSIMs) can be implemented on the eUICC 424. Each eSIM can be associated with a distinct subscriber identity and/or provide distinct services or subscriptions for a user of the multi-eSIM wireless device 422. Diagram 480 illustrates a diagram of a multi-eSIM/SIM wireless device 426 that includes a removable UICC 404, on which can be installed one or more SIMs, and an eUICC 424 on which one or more eSIMs can be installed. The combination of SIMs on the UICC 404 and/or eSIMs on the eUICC 424 can provide for connections to one or more wireless networks 410 using the wireless circuitry 408 under the control of the processor(s) 406 of the multi-SIM/eSIM wireless device 426. Diagram 490 illustrates another multi-SIM/eSIM wireless device 428 that includes multiple UICCs 404, on which one or more SIMs can be installed, and an eUICC 424, on which one or more eSIMs can be installed. The combination of SIMs on the UICCs 404 and/or eSIMs on the eUICC 424 can provide for connections to one or more wireless networks 410 using the wireless circuitry 408 under the control of the processor(s) 406 of the multi-SIM/eSIM wireless device 428.

In general, a wireless device that supports multiple subscriber identities can include at least one UICC 404 or at least one eUICC 424 or both. Each UICC 404 can support one or more SIMs, and each eUICC 424 can support one or more eSIMs. A wireless device that supports multiple subscriber identities, e.g., 402, 420, 422, 426, 428, can include a combination of SIMs and/or eSIMs to support communication with one or more wireless networks 410.

Figure 5A:
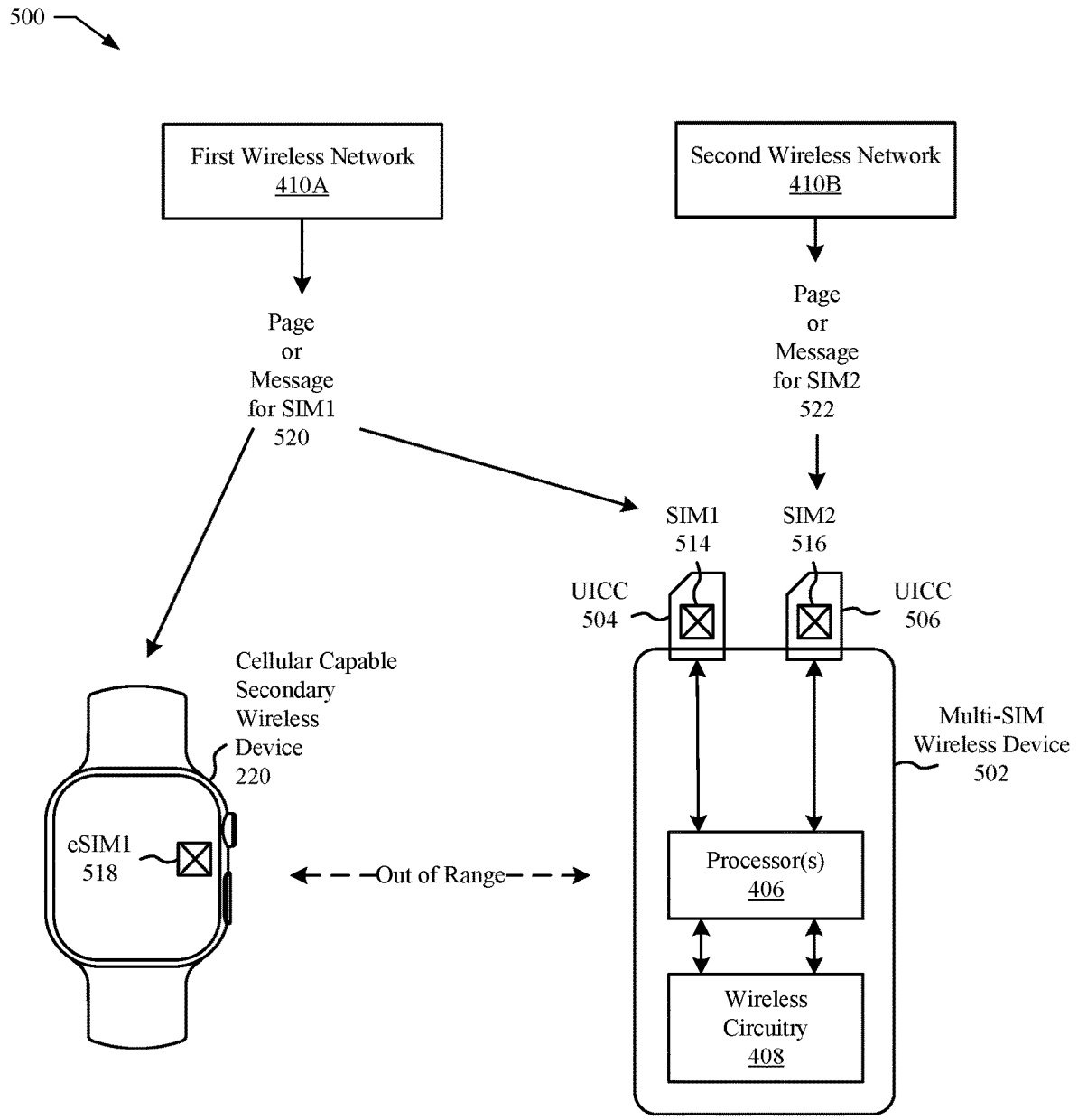
FIG. 5A illustrates an example of communication from wireless networks to a multi-SIM wireless device and an associated cellular capable secondary wireless device, in accordance with some embodiments.

FIG. 5A illustrates a diagram 500 of a multi-SIM wireless device 502 that can access services for multiple subscriber identities. The multi-SIM wireless device 502 includes a first UICC 504 on which SIM1 514 is active and a second UICC 506 on which SIM2 516 is active. SIM1 514 can provide for access to communication services of the first wireless network 410A, while SIM2 516 can provide for access to communication services of the second wireless network 410B. Each of the first wireless network 410A and the second wireless network 410B can communicate separately with the multi-SIM wireless device 502. The first wireless network 410A can send a page or message 520 directed to SIM1 514 of the UICC 504 of the multi-SIM wireless device 502, such as when seeking to establish a mobile terminated connection with the multi-SIM wireless device 502 or to deliver a short message service (SMS) text message to the multi-SIM wireless device 502. Similarly the second wireless network 410B can send a page or message 522 directed to SIM2 516 of the UICC 506 of the multi-SIM wireless device 502, such as when seeking to establish a mobile terminated connection with the multi-SIM wireless device 502 or to deliver a short message service (SMS) text message to the multi-SIM wireless device 502. While the multi-SIM wireless device 502 illustrated in FIG. 5A depicts a two UICCs, the same methods described herein can be applied to any combination of UICC and/or eUICC in a wireless device, such as in those multi-SIM wireless devices illustrated in FIG. 4B, to access two different sets of services provided by two different wireless networks.

A cellular capable secondary wireless device 220 can be paired with the multi-SIM wireless device 502 and can include eSIM1 518 that corresponds to SIM1 514 for access to communication services of the second wireless network 410B. A user of the multi-SIM wireless device 502 can pair the cellular capable secondary wireless device 220 with the multi-SIM wireless device 502 and can select which of SIM1 514 and SIM2 516 to use with the cellular capable secondary wireless device 220, and a corresponding SIM, e.g., eSIM1 518, on the cellular capable secondary wireless device 220 can be activated for use with the first wireless network 410A. When the cellular capable secondary wireless device 220 is within proximity of the multi-SIM wireless device 502, cellular wireless circuitry of the cellular capable secondary wireless device can operate in a power-reduced state and communication via a local connection, e.g., via a WPAN connection 204 and/or via a WLAN connection 206, with the multi-SIM wireless device 502 can allow for access to communication services by the cellular capable secondary wireless device 220 using a relayed connection through the multi-SIM wireless device 502. When the cellular capable secondary wireless device 220 is not within proximity of the multi-SIM wireless device 502 (or when local connections are not possible), access to communication services by the cellular capable secondary wireless device 220 can rely on direct connections to a wireless network, e.g., to the first wireless network 410A with which eSIM1 518 can be associated. The first wireless network 410A can send a page/message 520 for SIM1 514 (which also corresponds to eSIM 518) in parallel to both the multi-SIM wireless device 502 and to the cellular capable secondary wireless device 220. A connection can be established with either the multi-SIM wireless device 502 or the cellular capable secondary wireless device 220 depending on which of the devices a mobile terminated connection is accepted in response to a page. Messages, such as SMS messages, can be delivered to both the cellular capable secondary wireless device 220 and to the multi-SIM wireless device 502 in parallel.

When the cellular capable secondary wireless device 220 is within proximity of the multi-SIM wireless device 502, acceptance of a mobile terminated connection page message from the first wireless network 410A or from the second wireless network 410B can result in a relayed connection (when local connections are possible), including when a user accepts the mobile terminated connection page message at the cellular capable secondary wireless device 220. Additionally, when the cellular capable secondary wireless device 220 is not within proximity of the multi-SIM wireless device 502, acceptance of a mobile terminated connection page message from the first wireless network 410A can result in a direct connection at the cellular capable secondary wireless device 220, as the eSIM1 518 can correspond to SIM1 514 associated with the first wireless network 410A. When the cellular capable secondary wireless device 220 is not within proximity of the multi-SIM wireless device 502, however, acceptance of a mobile terminated connection page message from the second wireless network 410B can result in a direct connection at the multi-SIM wireless device 502 but not at the cellular capable secondary wireless device 220, as eSIM1 518 corresponds to SIM1 514 for the first wireless network 410A, and no corresponding eSIM for SIM2 516 of the second wireless network 410B is active at the cellular capable secondary wireless device 220. In some embodiments, only one eSIM can be active at a given time in the cellular capable secondary wireless device 220. Moreover, changing between eSIMs can require signaling with the corresponding wireless networks and can require significant time (more than a few seconds, and typically multiple minutes) to result in a change of eSIMs at a wireless device. Thus, as described further herein, conditional forwarding from one wireless network to another wireless network, e.g., from the second wireless network 410B to the first wireless network 410A, can be used to allow access to some communication services at the cellular capable secondary wireless device 220 when not within proximity of the multi-SIM wireless device 502.

Figure 5B:
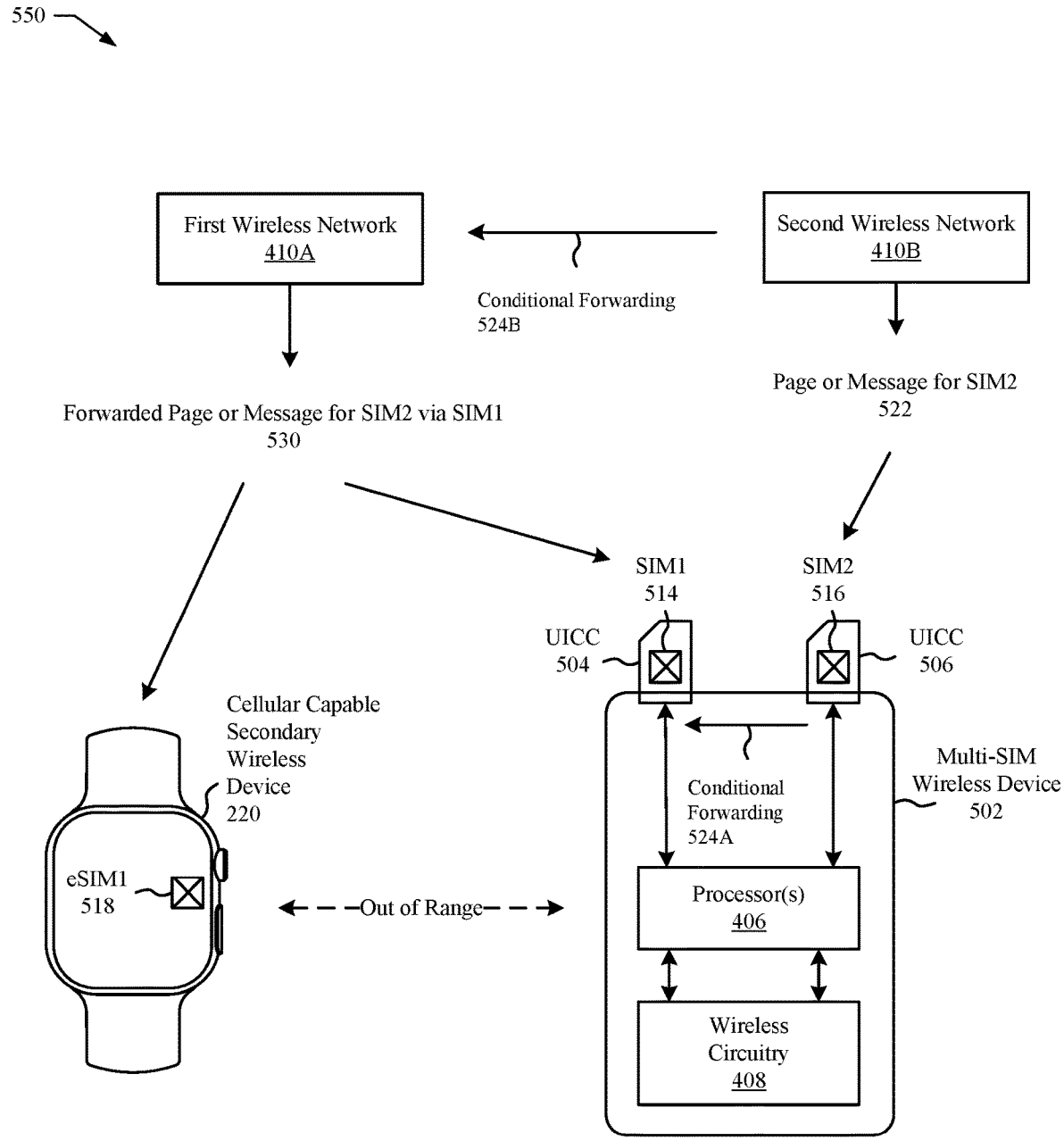
FIG. 5B illustrates an example of communication from wireless networks including conditional forwarding for a multi-SIM wireless device and an associated cellular capable secondary wireless device, in accordance with some embodiments.

FIG. 5B illustrates a diagram 550 of the multi-SIM wireless device 502, where a conditional forwarding 524B relationship between the second wireless network 410B and the first wireless network 410A can be used to provide forwarded page messages and/or SMS messages associated with SIM2 516 (for the second wireless network 410B) to also be received at the cellular capable secondary wireless device 220, on which eSIM1 518 associated with the first wireless network 410A is active. The conditional forwarding 524B relationship can be established when pairing the cellular capable secondary wireless device 220 with the multi-SIM wireless device 502 or subsequently thereafter through interaction via a user interface of the multi-SIM wireless device 502. For example, a user may select to receive page messages and/or SMS messages at the cellular capable secondary wireless device 220 for both SIM1 514 associated with the first wireless network 410A and SIM2 516 the second wireless network 410B, which can be accomplished at least in part by establishing a conditional forwarding 524A relationship between SIM2 516 and SIM1 514. Conditions for when forwarding occurs are described further herein.

The multi-SIM wireless device 502 can communicate, e.g., via signaling messages, with the second wireless network 410B to establish a static conditional forwarding 524B relationship to the first wireless network 410A, where a page or message 522 for SIM2 are forwarded conditionally to the first wireless network 410A when the multi-SIM wireless device 502 does not respond. Conditions for forwarding of the page/message 522 for SIM2 can include (i) when the multi-SIM wireless device 502 is not reachable, such as when not camped on the second wireless network 410B, (ii) when no response is received from the multi-SIM wireless device 502 by the second wireless network 410B responsive to the page/message 522 for SIM2, or (iii) when a negative response is received from the multi-SIM wireless device 502 responsive to the page/message 522 for SIM2. The second wireless network 410B can forward an incoming (mobile terminated) connection request and/or other messages to the first wireless network 410A for communication as a forwarded page/message 530 for SIM2 via SIM1 to the cellular capable secondary wireless device 220. In some embodiments, conditional forwarding occurs whether the cellular capable secondary wireless device 220 is within proximity or not within proximity of the multi-SIM wireless device 502. In some embodiments, conditional forwarding occurs based at least in part on whether the cellular capable secondary wireless device 220 is not within proximity of the multi-SIM wireless device 502. In some embodiments, the multi-SIM wireless device 502 maintains a wearing status of the cellular capable secondary wireless device 220, which can be provided directly by the cellular capable secondary wireless device 220 when within proximity of the multi-SIM wireless device 502, or which can be provided indirectly via a network accessible server, e.g., an iCloud server, when the cellular capable secondary wireless device 220 is not within proximity of the multi-SIM wireless device 502. In some embodiments, the wearing status can indicate whether the cellular capable secondary wireless device 220 is being worn, e.g., in contact with a user, or is not being worn, e.g., not in contact with a user or connected to an external power source, such as a magnetic charger as used for an Apple Watch. In some embodiments, the forwarded page/message 530, for SIM2 communicated via SIM1, includes an indication of forwarding, e.g., within a field of a SIP invite message when received from an LTE wireless network, or within a supplemental service field, such as a NotifySS field, of the page message when received from a non-LTE wireless network. In some embodiments, the forwarded page/message 530 does not include an indication of forwarding, and the multi-SIM wireless device 502 can determine whether a received page/message is the forwarded page/message 530 from the first wireless network 410A on behalf of the second wireless network 410B or is a separate page/message (not shown) from the first wireless network 410A. In some embodiments, the multi-SIM wireless device 502 examines caller identification, e.g., a caller ID field, of the received page/message and compares the caller identification to a similar caller identification for a most recently received page/message from the second wireless network 410B. As the forwarded page/message 530 for SIM2 via SIM1 from the first wireless network 410A may be received within a short time period of the page/message 522 for SIM2 received from the second wireless network 410B, the multi-SIM wireless device 502 can conclude, when both page messages have the same caller identification and are received within a predetermined time period, that the second received page messages is a forwarded page/message 530.

Conditional forwarding of page messages for mobile terminated connection requests and SMS messages can be configured via a user interface of the multi-SIM wireless device 502 when pairing with the cellular capable secondary wireless device 220 or afterwards, e.g., via configuration settings accessible via the user interface of the multi-SIM wireless device 502. Changes to SIMs/eSIMs in the multi-SIM wireless device 502 can result in updating and/or canceling of conditional forwarding of page messages. For example, upon removal of UICC 506 with SIM2 516, conditional forwarding of pages or messages for SIM2 516 by the second wireless network 410B to the first wireless network 410A may be discontinued. In some embodiments, a user of the multi-SIM wireless device 502 can be notified, e.g., via a user interface of the multi-SIM wireless device 502, to update manually the conditional forwarding 524B relationship, such as by signaling to the second wireless network 410B. When another UICC that includes another SIM replaces UICC 506, the user can be alerted to update conditional forwarding and/or to accept automatically an update to conditional forwarding, e.g., to establish a conditional forwarding relationship between a wireless network associated with the another SIM to the first wireless network 410A. In some embodiments, manual selection of acceptance and/or establishment of the updated conditional forwarding can be required. In some embodiments, notification of an updated conditional forwarding is presented via a user interface of the multi-SIM wireless device 502. Similarly, when UICC 504 that includes SIM1 514 is replaced by another UICC with another SIM, the existing conditional forwarding 524B relationship between the second wireless network 410B can be replaced with an updated conditional forwarding relationship from the second wireless network 410B to the wireless network associated with the another SIM of the another UICC that replaces UICC 504. Additionally, when replacing UICC 504, the eSIM1 518 of the cellular capable secondary wireless device 220 may require updating to another eSIM. Replacement of eSIMs on eUICCs of a multi-SIM/eSIM wireless device, such as any of the wireless devices illustrated in FIG. 4B can similarly result in updating of conditional forwarding to wireless network that correspond to the updated SIMs/eSIMs in use, with applicable notifications provided via a user interface of the affected wireless devices.

Figure 6:
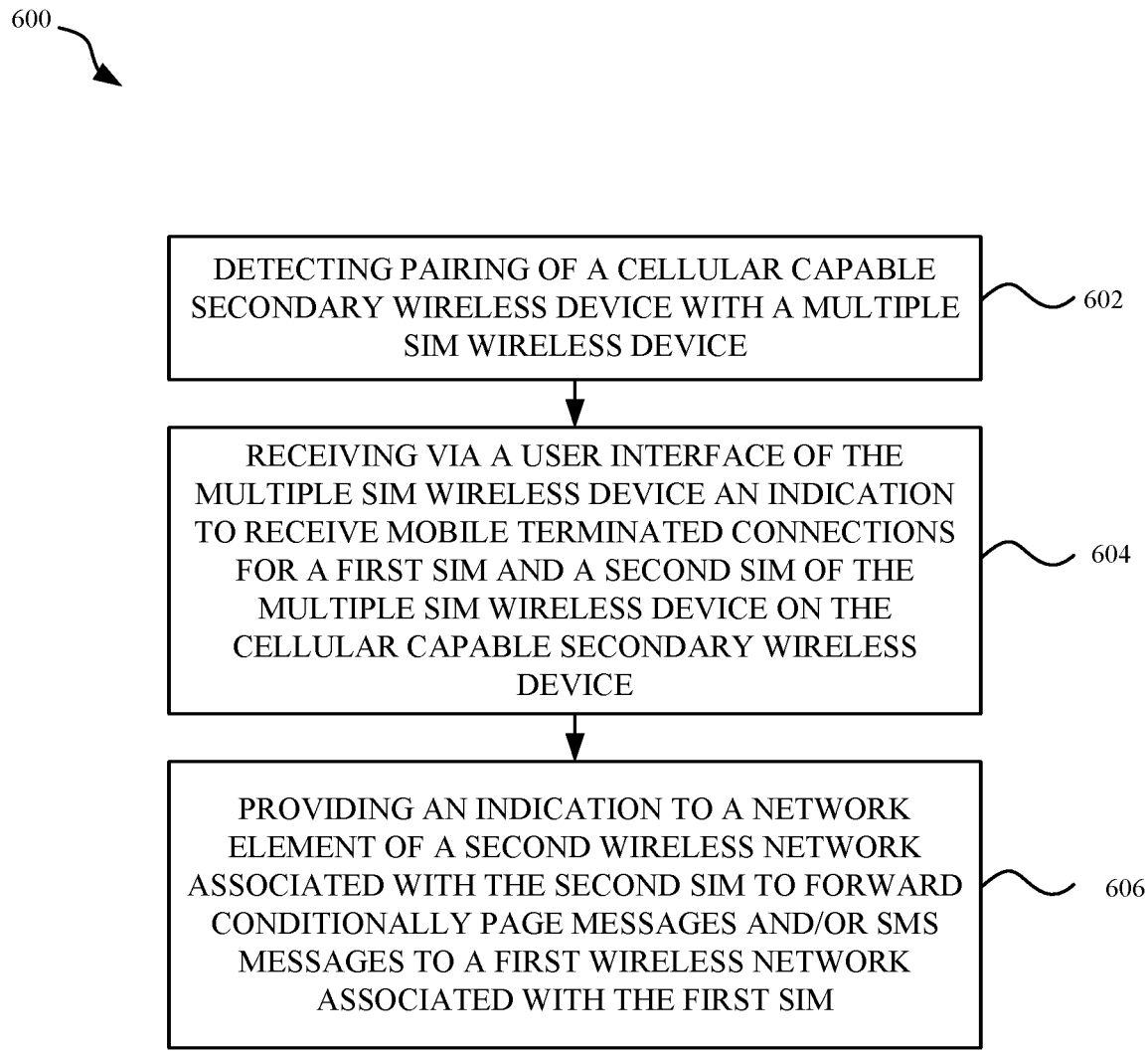
FIG. 6 illustrates an exemplary method for configuring conditional forwarding during pairing of a cellular capable secondary wireless device with a multi-SIM wireless device, in accordance with some embodiments.

FIG. 6 illustrates a flowchart 600 of an exemplary method for configuring conditional forwarding during pairing of a cellular capable secondary wireless device 220 with a multi-SIM wireless device 502. At 602, a multiple SIM (multi-SIM) wireless device 502 detects pairing with a cellular capable secondary wireless device 220. At 604, the multi-SIM wireless device 502 receives, via a user interface of the multi-SIM wireless device 502, an indication to receive mobile terminated connections (and/or page messages and/or SMS messages) for a first SIM, e.g., SIM1 514, and a second SIM, e.g., SIM2 516, on the cellular capable secondary wireless device 220. In some embodiments, the indication is received in response to a notification provided via the user interface of the multi-SIM wireless device 502. In some embodiments, the notification is provided responsive to the pairing of the cellular capable secondary wireless device 220 with the multi-SIM wireless device 502. In some embodiments, the indication is received via a configuration setting by a user of the multi-SIM wireless device 502. At 606, the multi-SIM wireless device provides an indication to a network element of a second wireless network 410B associated with the second SIM, e.g., SIM2 516, to forward conditionally mobile terminated page messages and/or SMS messages to a first wireless network 410A associated with the first SIM, e.g., SIM1 514.

Figure 7:
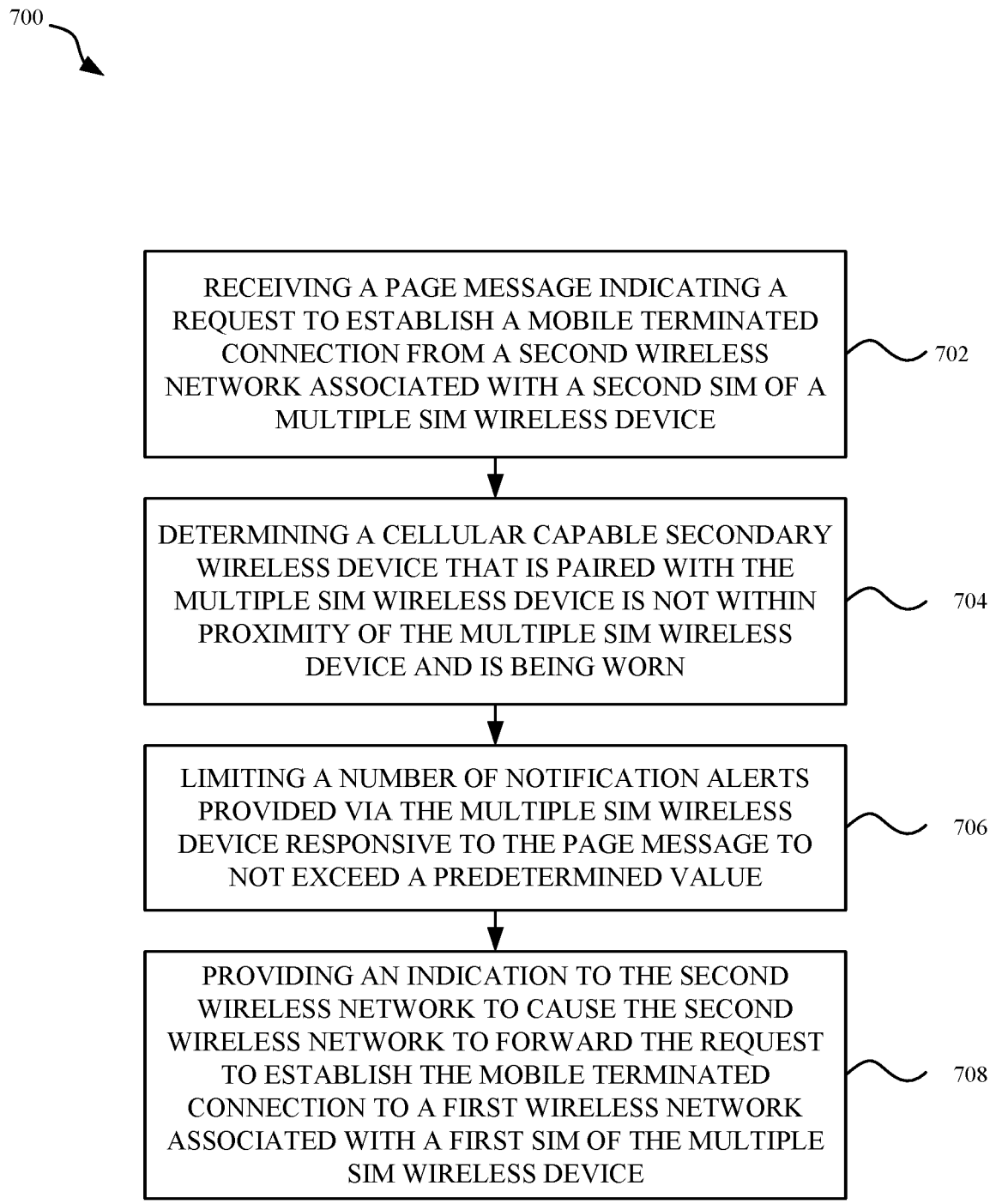
FIG. 7 illustrates an exemplary method for conditional forwarding page messages to a cellular capable secondary wireless device, in accordance with some embodiments.

FIG. 7 illustrates a flowchart 700 of an exemplary method for conditional forwarding of page messages to a cellular capable secondary wireless device 220. At 702, a multi-SIM wireless device 502 receives a page message from a second wireless network 410B associated with a second SIM, e.g., SIM2 516, of the multi-SIM wireless device 502, the page message indicating a request to establish a mobile terminated connection with the multi-SIM wireless device 502. At 704, the multi-SIM wireless device 502 determines that a cellular capable secondary wireless device 220, which is paired with the multi-SIM wireless device 502, is not within proximity of the multi-SIM wireless device 502 and has a wearing status that indicates the cellular capable secondary wireless device 220 is being worn. In some embodiments, the multi-SIM wireless device 502 determines proximity of the cellular capable secondary wireless device 220 based at least in part on an ability to establish and/or to maintain a WPAN connection 204 or a WLAN connection 206 with the cellular capable secondary wireless device 220. In some embodiments, the multi-SIM wireless device 502 determines proximity of the cellular capable secondary wireless device 220 based at least in part on whether a WPAN connection 204 or a WLAN connection 206 exists between the multi-SIM wireless device 502 and the cellular capable secondary wireless device 220. In some embodiments, the multi-SIM wireless device 502 determines a most recent (or current) wearing status of the cellular capable secondary wireless device 220. In some embodiments, the cellular capable secondary wireless device 220 provides information about its wearing status regularly and/or irregularly, e.g., responsive to a request for wearing status, to the multi-SIM wireless device 502. In some embodiments, the cellular capable secondary wireless device 220 provides information about its wearing status regularly to a network accessible server that is associated with a common user account for both the cellular capable secondary wireless device 220 and the multi-SIM wireless device 502. In some embodiments, the multi-SIM wireless device 502 queries the network accessible server to determine a most recent (or current) wearing status of the cellular capable secondary wireless device 220. At 706, when the cellular capable secondary wireless device 220 is not within proximity of the multi-SIM wireless device 502 and is being worn, the multi-SIM wireless device 502 limits a number of notification alerts provided via the multi-SIM wireless device 502 to not exceed a predetermined value responsive to receipt of the page message from the second wireless network 410B. Notification alerts can be limited in number and/or type of alert presented, e.g., visual alerts only rather than audible alerts. At 708, the multi-SIM wireless device 502 provides an indication to the second wireless network 410B to cause the second wireless network 410B to forward the request to establish the mobile terminated connection to a first wireless network 410A associated with a first SIM, e.g., SIM1 514, of the multi-SIM wireless device 502. In some embodiments, the indication is provided to the second wireless network 410B when no response and/or a negative response is received via a user interface of the multi-SIM wireless device 502 for the page message.

Figure 8:
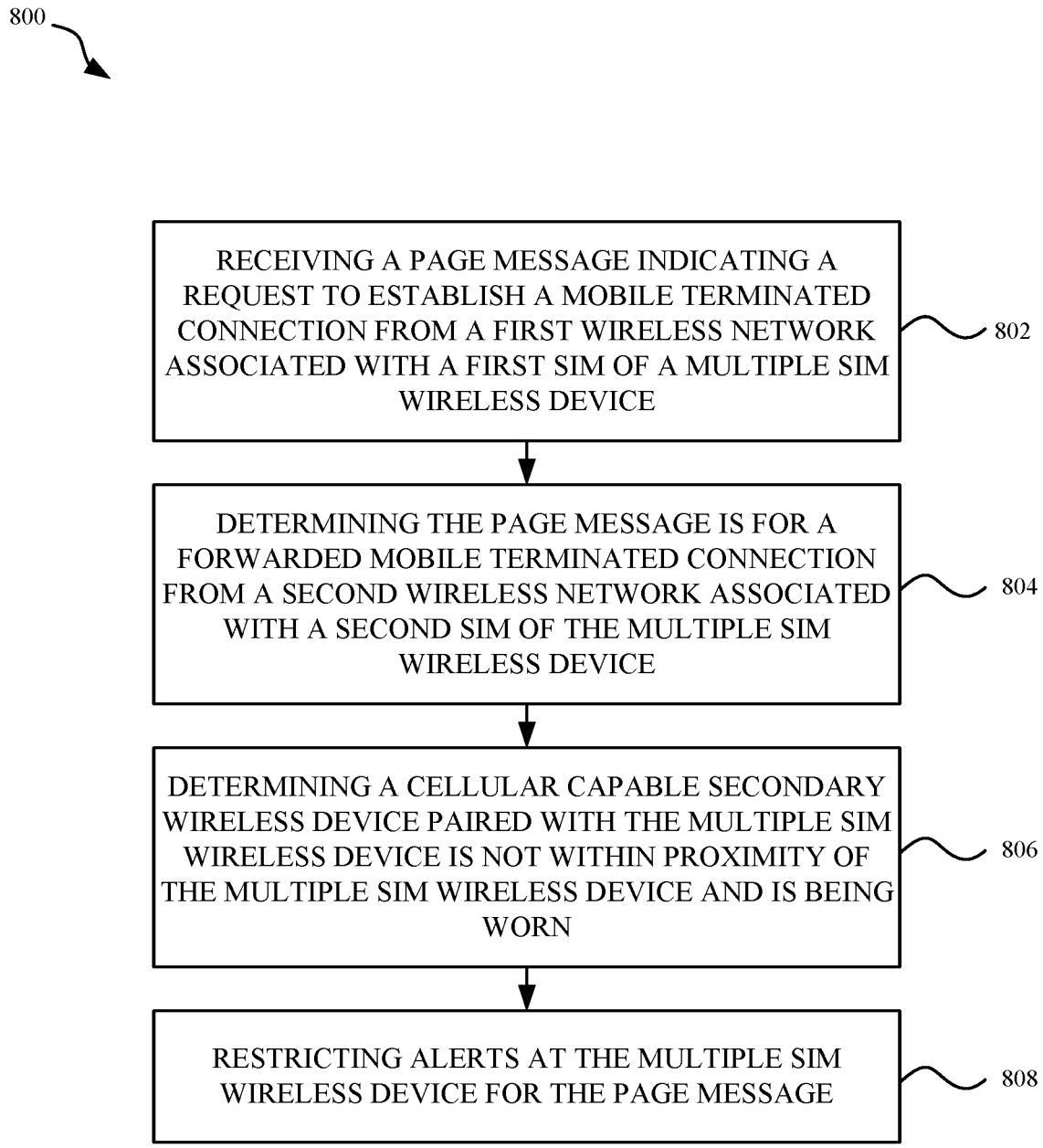
FIG. 8 illustrates an exemplary method for adjusting alert notifications at a multi-SIM wireless device when conditional forwarding page messages to a cellular capable secondary wireless device, in accordance with some embodiments.

FIG. 8 illustrates a flowchart 800 of an exemplary method for adjusting alert notifications at a multi-SIM wireless device 502 when conditional forwarding page messages to a cellular capable secondary wireless device 220. At 802, the multi-SIM wireless device 502 receives a page message from a first wireless network 410A directed to a first SIM, e.g., SIM1 514, of the multi-SIM wireless device 502, the page message indicating a request to establish a mobile terminated connection with the multi-SIM wireless device 502. At 804, the multi-SIM wireless device determines that the page message is for a (conditionally) forwarded mobile terminated connection from a second wireless network 410B associated with a second SIM, e.g., SIM2 516, of the multi-SIM wireless device 502. In some embodiments, the multi-SIM wireless device 502 parses the page message to examine a field of the page message to determine whether the page message is a conditionally forwarded page message. In some embodiments, the page message is a SIP invite message from the first wireless network 410A and includes a value in a field that indicates the SIP invite message corresponds to a forwarded page message. In some embodiments, the page message is for a circuit-switched connection from the first wireless network 410A and includes a supplemental service notification, e.g., a NotifySS field, that includes a value to indicate the page message corresponds to a forwarded page message. In some embodiments, the multi-SIM wireless device 502 compares a caller identification field of the page message from the first wireless network 410A to a caller identification field of a most recently received page message from the second wireless network 410B to determine whether the caller identification fields correspond to the same calling party. In some embodiments, the multi-SIM wireless device 502 determines the page message from the first wireless network 410A is for a conditionally forwarded page message from the second wireless network 410B when the caller identification field values of both the page message from the first wireless network 410A and a most recently received page message from the second wireless network 410B match and the page messages are both received by the multi-SIM wireless device 502 within a predetermined time period, e.g., within several seconds.

At 806, the multi-SIM wireless device 502 determines that a cellular capable secondary wireless device 220, which is paired with the multi-SIM wireless device 502, is not within proximity of the multi-SIM wireless device 502 and has a wearing status that indicates the cellular capable secondary wireless device 220 is being worn. In some embodiments, the multi-SIM wireless device 502 determines proximity of the cellular capable secondary wireless device 220 based at least in part on an ability to establish and/or to maintain a WPAN connection 204 or a WLAN connection 206 with the cellular capable secondary wireless device 220. In some embodiments, the multi-SIM wireless device 502 determines proximity of the cellular capable secondary wireless device 220 based at least in part on whether a WPAN connection 204 or a WLAN connection 206 exists between the multi-SIM wireless device 502 and the cellular capable secondary wireless device 220. In some embodiments, the multi-SIM wireless device 502 determines a most recent (or current) wearing status of the cellular capable secondary wireless device 220. In some embodiments, the cellular capable secondary wireless device 220 provides information about its wearing status regularly and/or irregularly, e.g., responsive to a request for wearing status, to the multi-SIM wireless device 502. In some embodiments, the cellular capable secondary wireless device 220 provides information about its wearing status regularly to a network accessible server that is associated with a common user account for both the cellular capable secondary wireless device 220 and the multi-SIM wireless device 502. In some embodiments, the multi-SIM wireless device 502 queries the network accessible server to determine a most recent (or current) wearing status of the cellular capable secondary wireless device 220. At 808, when the multi-SIM wireless device 502 determines the cellular capable secondary wireless device 220 is not within proximity of the multi-SIM wireless device 502 and is being worn, and the page message received from the first wireless network 410A has been conditionally forwarded from the second wireless network 410B, the multi-SIM wireless device 502 restricts notification alerts at the multi-SIM wireless device 502 for the page message received from the first wireless network 410A. In some embodiments, restriction of notification alerts includes suppressing audible indications and/or visual indications of the page message at the multi-SIM wireless device 502.

Figure 9:
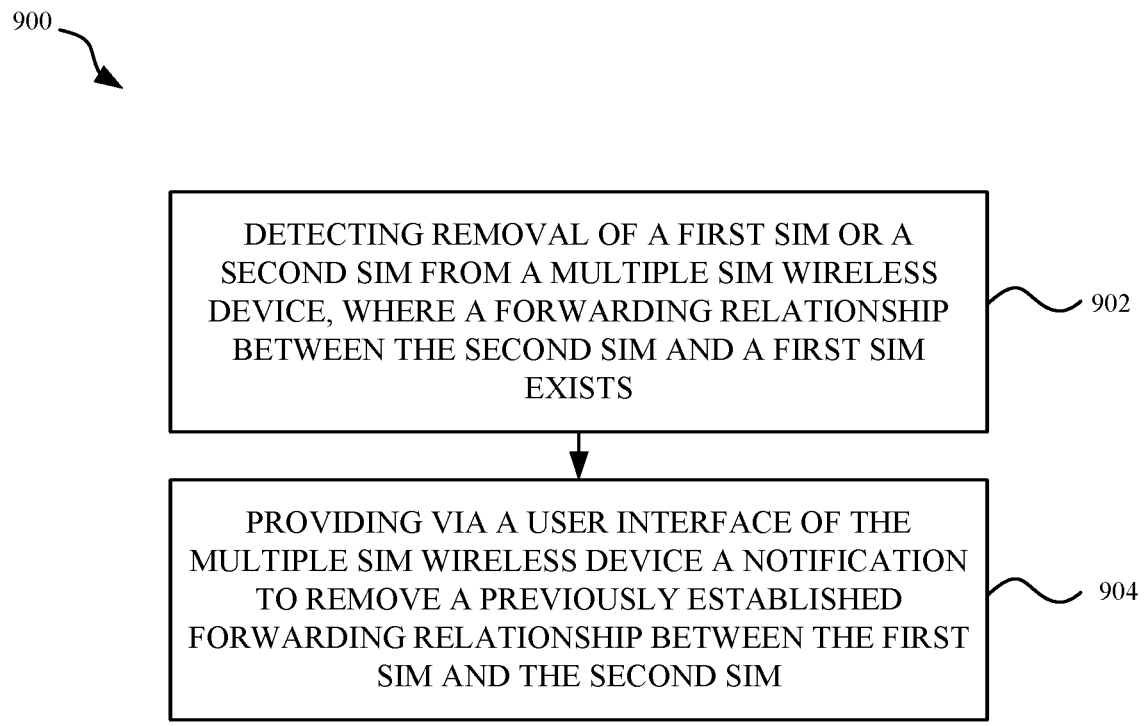
FIG. 9 illustrates an exemplary method for adjusting conditional forwarding relationships between SIMs at a multi-SIM wireless device, in accordance with some embodiments.

FIG. 9 illustrates a flowchart 900 of an exemplary method for adjusting conditional forwarding relationships between SIMs at a multi-SIM wireless device 502. At 902, the multi-SIM wireless device 502 detects removal of a first SIM, e.g., SIM1 514, or of a second SIM, e.g., SIM2 516, where a conditional forwarding relationship between the first and second SIMs exists, e.g., SIM2 516 to SIM1 514. At 904, the multi-SIM wireless device 502 presents, via a user interface of the multi-SIM wireless device 502, a notification alert to indicate a requirement for the previously established conditional forwarding relationship between the first SIM and the second SIM to be removed. In some embodiments, when SIM1 514 is removed, the multi-SIM wireless device 502 signals to the second wireless network 410B to remove (or otherwise disable) forwarding of page messages and/or SMS messages from the second wireless network 410B to the first wireless network 410A. In some embodiments, when SIM2 516 is removed, a notification to the user indicates a requirement to re-insert the SIM2 516 in order to communicate signaling to the second wireless network 410B to remove (or otherwise disable) forwarding of page messages and/or SMS messages from the second wireless network 410B to the first wireless network 410A. In some embodiments, removal of the first SIM includes removal of a UICC on which the first SIM resides. In some embodiments, removal of the first SIM includes deactivation and/or deletion of an eSIM of an eUICC of the multi-SIM wireless device 502. In some embodiments, removal of the second SIM includes removal of a UICC on which the second SIM resides. In some embodiments, removal of the second SIM includes deactivation and/or deletion of an eSIM of an eUICC of the multi-SIM wireless device 502.

Figure 10:
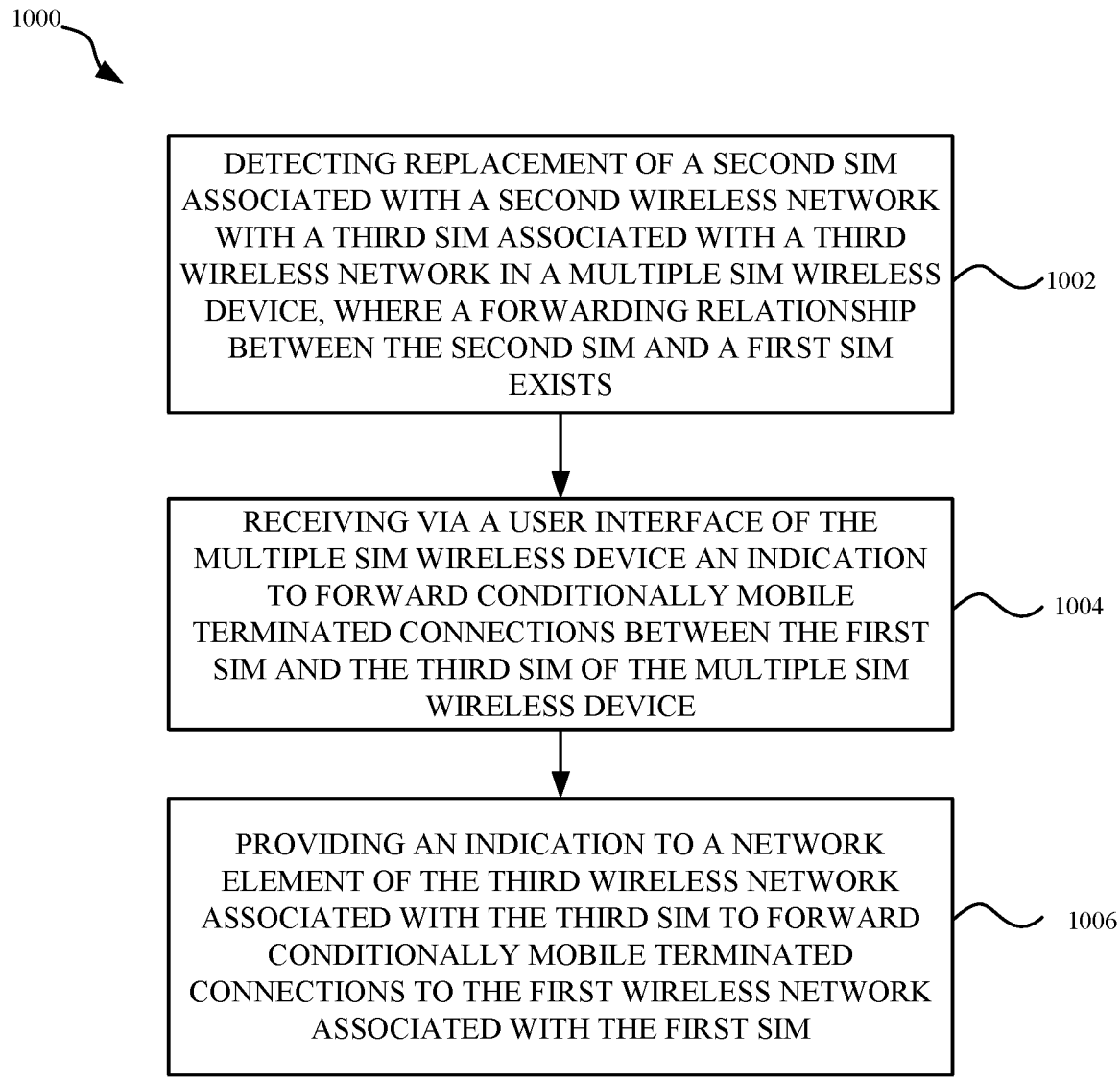
FIG. 10 illustrates another exemplary method for adjusting conditional forwarding relationships between SIMs at a multi-SIM wireless device, in accordance with some embodiments.

FIG. 10 illustrates a flowchart 1000 of another exemplary method for adjusting conditional forwarding relationships between SIMs at a multi-SIM wireless device 502. At 1002, the multi-SIM wireless device 502 detects replacement of a second SIM, e.g., SIM2 516, associated with a second wireless network 410B with a third SIM associated with a third wireless network, where a conditional forwarding relationship between the second SIM and a first SIM, e.g., SIM1 514, associated with a first wireless network 410A exists. At 1004, the multi-SIM wireless device 502 receives, via a user interface of the multi-SIM wireless device 502, an indication to forward conditionally page messages, such as for mobile terminated connections, and/or SMS messages received for the third SIM from a third wireless network to the first wireless network 410A associated with the first SIM, e.g., SIM1 514. In some embodiments, the multi-SIM wireless device 502 presents an option and/or a notification to a user of the multi-SIM wireless device 502, e.g., via the user interface of the multi-SIM wireless device 502, to allow for reception of page messages for incoming mobile terminated connections at a cellular capable secondary wireless device 220 paired with the multi-SIM wireless device 502, including when the cellular capable secondary wireless device 220 is not within proximity of the multi-SIM wireless device 502 and is being worn. At 1006, the multi-SIM wireless device 502 provides an indication to a network element of the third wireless network associated with the third SIM to forward page messages for mobile terminated connections and/or SMS messages to the first wireless network 410A associated with the first SIM, e.g., SIM1 514. In some embodiments, the multi-SIM wireless device 502 waits for confirmation of a configuration or setting received via a user interface of the multi-SIM wireless device 502 before providing the indication to the network element of the third wireless network. In some embodiments, the multi-SIM wireless device 502 offers, via a user interface of the multi-SIM wireless device 502, an option to accept forwarding from the third wireless network associated with the third SIM to the first wireless network 410A associated with the first SIM, e.g., SIM1 514.

Figure 11:
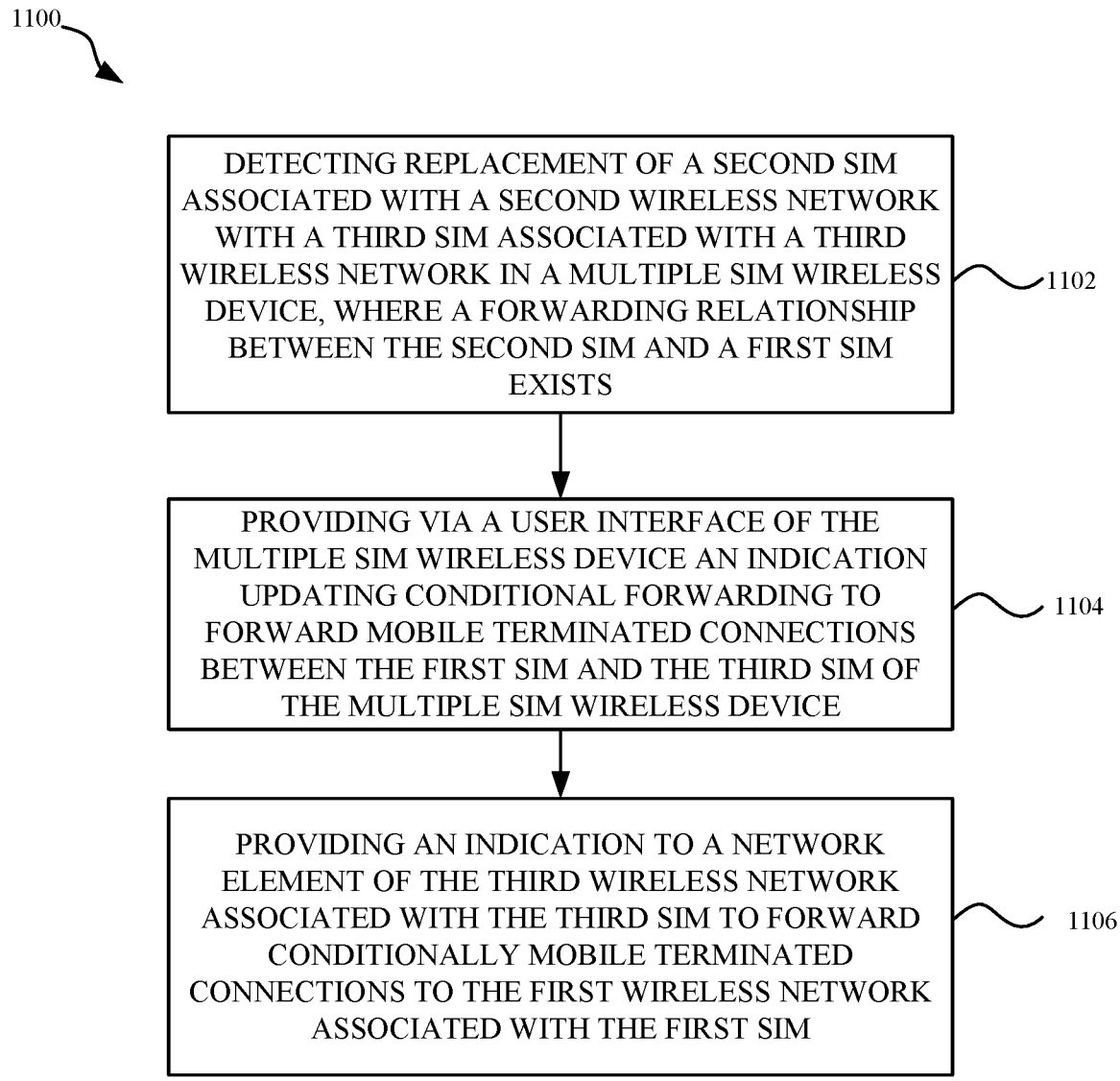
FIG. 11 illustrates a further exemplary method for adjusting conditional forwarding relationships between SIMs at a multi-SIM wireless device, in accordance with some embodiments.

FIG. 11 illustrates a flowchart 1100 of a further exemplary method for adjusting conditional forwarding relationships between SIMs at a multi-SIM wireless device 502. At 1102, the multi-SIM wireless device 502 detects replacement of a second SIM, e.g., SIM2 516, associated with a second wireless network 410B with a third SIM associated with a third wireless network, where a conditional forwarding relationship between the second SIM and a first SIM, e.g., SIM1 514, associated with a first wireless network 410A exists. At 1104, the multi-SIM wireless device 502 presents a notification to a user of the multi-SIM wireless device 502, e.g., via the user interface of the multi-SIM wireless device 502, that conditional forwarding is updated from based on replacement of the second SIM with the third SIM, and page messages for incoming mobile terminated connections can be received at a cellular capable secondary wireless device 220 paired with the multi-SIM wireless device 502 for the third SIM (as well as for the first SIM, the latter for which an eSIM is active in the cellular capable secondary wireless device 220), including when the cellular capable secondary wireless device 220 is not within proximity of the multi-SIM wireless device 502 and is being worn. In some embodiments, the conditional forwarding is automatically updated by the multi-SIM wireless device 502 by providing the indication to the third wireless network without requiring confirmation from a user of the multi-SIM wireless device 502. At 1106, the provides an indication to a network element of the third wireless network associated with the third SIM to forward page messages for mobile terminated connections and/or SMS messages to the first wireless network 410A associated with the first SIM, e.g., SIM1 514.

Figure 12:
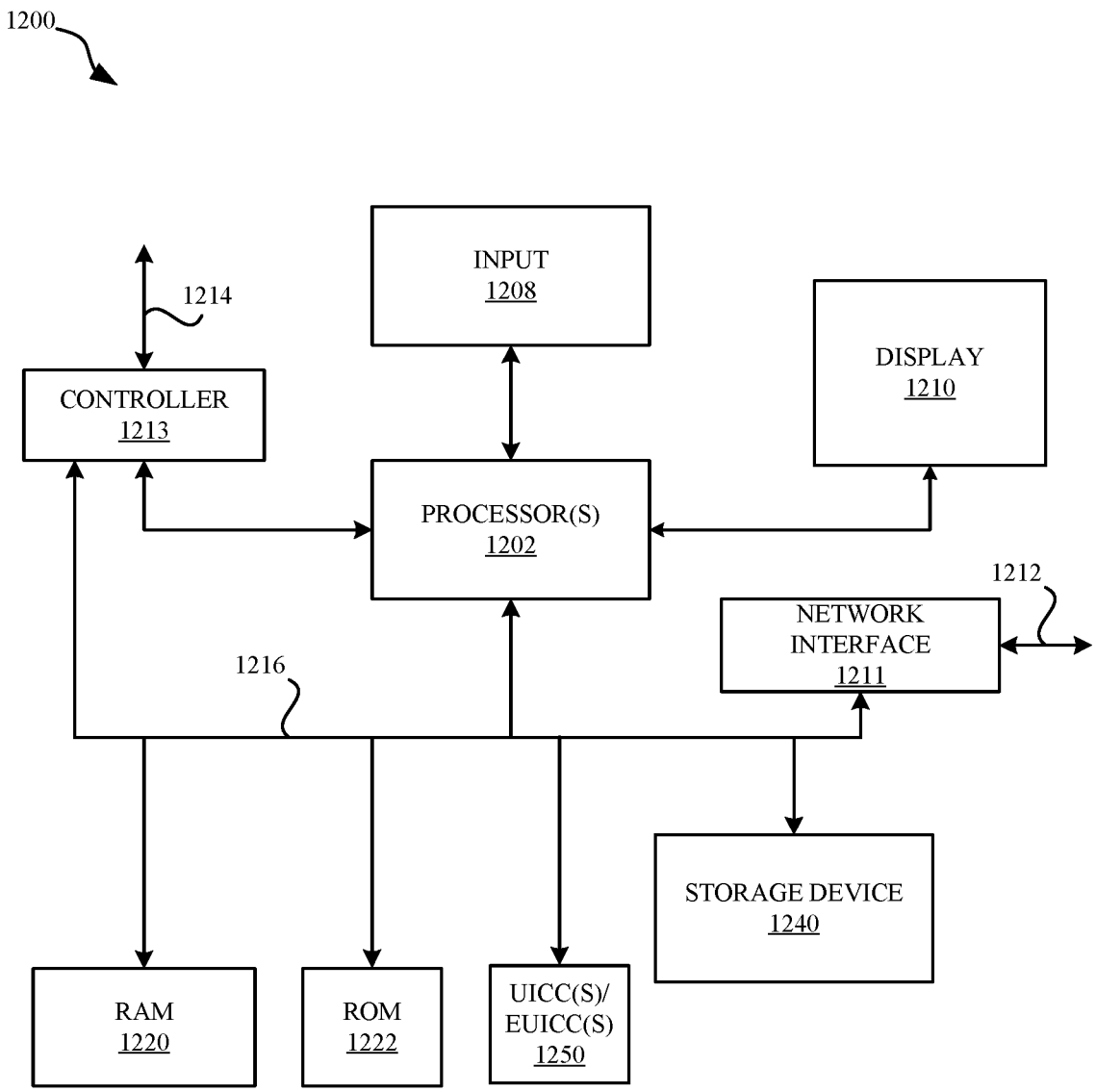
FIG. 12 illustrates an example set of components of a wireless device, in accordance with some embodiments.

FIG. 12 illustrates a detailed view of a computing device 1200 that can be used to implement the various components described herein, according to some embodiments. In particular, the detailed view illustrates various components that can be included in the wireless devices illustrated in FIGS. 1, 2A, 2B, 3, 4A, 4B, 5A, 5B and/or described herein. As shown in FIG. 12, the computing device 1200 can include one or more processors 1202 that represent microprocessors and/or controllers for controlling the overall operation of computing device 1200. The computing device 1200 can also include an input 1208 that allows a user of the computing device 1200 to interact with the computing device 1200, e.g., a user interface of the computing device 1200. For example, the input 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user. In some embodiments, the display 1210 and at least part of the input 1208 can be combined. A data bus 1216 can facilitate data transfer between at least a storage device 1240, the processor(s) 1202, and a controller 1213. The controller 1213 can be used to interface with and control different equipment through and equipment control bus 1214. The computing device 1200 can also include a network/bus interface 1211 that couples to a data link 1212. In the case of a wireless connection, the network/bus interface 1211 can include one or more wireless transceivers.

The computing device 1200 also include a storage device 1240, which can comprise a single disk or a plurality of disks (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory (RAM) 1220 and a Read-Only Memory (ROM) 1222. The ROM 1222 can store programs, utilities or processes to be executed in a non-volatile manner. The RAM 1220 can provide volatile data storage, and stores instructions related to the operation of the computing device 1200. The computing device 1200 can further include one or more UICCs/eUICCs 1250 that can store one or more SIMs and/or eSIMs.

In some embodiments, a method for conditional forwarding between a first subscriber identity module (SIM) and a second SIM of a multiple SIM (multi-SIM) wireless device includes the multi-SIM wireless device: (i) receiving a page message from a second wireless network associated with the second SIM of the multi-SIM wireless device, the page message indicating a request to establish a mobile terminated connection with the multi-SIM wireless device; (ii) determining a cellular capable secondary wireless device that is paired with the multi-SIM wireless device is not within proximity of the multi-SIM wireless device and a wearing status of the cellular capable secondary wireless device indicates the cellular capable secondary wireless device is being worn; (iii) limiting a number of notification alerts provided via the multi-SIM wireless device to not exceed a predetermined value responsive to receipt of the page message from the second wireless network; and (iv) providing an indication to the second wireless network to cause the second wireless network to forward the request to establish the mobile terminated connection to a first wireless network associated with the first SIM of the multi-SIM wireless device.

In some embodiments, the multi-SIM wireless device determines proximity of the cellular capable secondary wireless device based at least in part on determining whether a wireless personal area network (WPAN) connection and/or a wireless local area network (WLAN) connection can be established with (and/or is established with) the cellular capable secondary wireless device. In some embodiments, the multi-SIM wireless device determines proximity of the cellular capable secondary wireless device based at least in part on whether a WPAN connection or a WLAN connection exists between the multi-SIM wireless device and the cellular capable secondary wireless device. In some embodiments, the multi-SIM wireless device determines the wearing status of the cellular capable secondary wireless device by accessing a most recently reported wearing status of the cellular capable secondary wireless device. In some embodiments, the most recently reported wearing status of the cellular capable secondary wireless device is stored at the multi-SIM wireless device. In some embodiments, the most recently reported wearing status of the cellular capable secondary wireless device is stored at a network accessible server that is queried by the multi-SIM wireless device. In some embodiments, the network server includes account information for a common account for the multi-SIM wireless device and the cellular capable secondary wireless device. In some embodiments, the multi-SIM wireless device limits the number of notification alerts to visual alerts only and suppresses audible alerts. In some embodiments, the multi-SIM wireless device provides the indication to the second wireless network when no response is received via a user interface of the multi-SIM wireless device for the page message. In some embodiments, the multi-SIM wireless device provides the indication to the second wireless network when a negative response is received via a user interface of the multi-SIM wireless device for the page message.

In some embodiments, a method for adjusting alert notifications at a multi-SIM wireless device includes the multi-SIM wireless device: (i) receiving a page message from a first wireless network associated with a first SIM of the multi-SIM wireless device, the page message indicating a request to establish a mobile terminated connection with the multi-SIM wireless device; (ii) determining the page message from the first wireless network includes a forwarded connection request from a second wireless network associated with a second SIM of the multi-SIM wireless device; (iii) determining a cellular capable secondary wireless device that is paired with the multi-SIM wireless device is not within proximity of the multi-SIM wireless device and a wearing status of the cellular capable secondary wireless device indicates the cellular capable secondary wireless device is being worn; and (iv) restricting notification alerts provided via the multi-SIM wireless device responsive to receipt of the page message from the first wireless network.

In some embodiments, the multi-SIM wireless device restricts the notification alerts for the page message from the first wireless network to visual alerts only and suppresses audible alerts. In some embodiments, the multi-SIM wireless device determines the page message from the first wireless network includes the forwarded connection request from the second wireless network by at least parsing the page message to examine a field of the page message to determine whether the page message is a forwarded page message. In some embodiments, the page message from the first wireless network includes a SIP invite message that includes a value indicating the page message is forwarded from the second wireless network. In some embodiments, the page message includes a supplemental service notification having a field value that indicates the page message is forwarded from the second wireless network. In some embodiments, the multi-SIM wireless device determines the page message from the first wireless network includes the forwarded connection request from the second wireless network by at least: (i) determining a caller identification field value of the page message from the first wireless network and a corresponding caller identification field value of a most recently received page message from the second wireless network match; and (ii) the page message from the first wireless network and the most recently received page message from the second wireless network are received within a predetermined time period.

In some embodiments, a method to establish conditional forwarding between a first subscriber identity module (SIM) and a second SIM of a multiple SIM (multi-SIM) wireless device includes the multi-SIM wireless device: (i) detecting pairing of a cellular capable secondary wireless device with the multi-SIM wireless device; (ii) receiving, via a user interface of the multi-SIM wireless device, an indication to receive page messages for mobile terminated connections for both the first SIM and the second SIM on the cellular capable secondary wireless device; and (iii) providing an indication to a network element of a second wireless network associated with the second SIM to forward conditionally page messages and/or short message service (SMS) messages to a first wireless network associated with the first SIM.

In some embodiments, the multi-SIM wireless device includes: (i) a removable universal integrated circuit card (UICC) that stores the second SIM; and (iii) an embedded UICC (eUICC) that stores the first SIM as an electronic SIM (eSIM). In some embodiments, the cellular capable secondary wireless device includes an active electronic SIM (eSIM) that corresponds to the first SIM of the multi-SIM wireless device and is associated with the first wireless network. In some embodiments, the method further includes the multi-SIM wireless device providing a notification via the user interface of the multi-SIM wireless device responsive to detecting pairing of the cellular capable secondary wireless device with the multi-SIM wireless device, the notification indicating an option to receive page messages and/or SMS messages at the cellular secondary wireless device for the first SIM and the second SIM, where the indication to receive page messages is received via the user interface of the multi-SIM wireless device responsive to the provided notification. In some embodiments, the indication to receive page messages is received via the user interface through a configuration setting of the multi-SIM wireless device.

In some embodiments, a wireless device configured to access services of a first wireless network and a second wireless network includes: (i) wireless circuitry configurable to communicate via a first radio access network of the first wireless network and via a second radio access network of the second wireless network, the wireless circuitry including one or more antennas; (ii) one or more processors communicatively coupled to the wireless circuitry; and (iii) a memory communicatively coupled to the one or more processors, where the one or more processors are configured to execute instructions stored in the memory to cause the wireless device to receive a page message from the second wireless network associated with a second SIM of the wireless device, the page message indicating a request to establish a mobile terminated connection with the wireless device; to determine a cellular capable secondary wireless device that is paired with the wireless device is not within proximity of the wireless device and a wearing status of the cellular capable secondary wireless device indicates the cellular capable secondary wireless device is being worn; and to provide an indication to the second wireless network to cause the second wireless network to forward the request to establish the mobile terminated connection to a first wireless network associated with a first SIM of the wireless device.

In some embodiments, execution of the instructions further causes the wireless device to limit a number of notification alerts provided via the wireless device to not exceed a predetermined value responsive to receipt of the page message from the second wireless network. In some embodiments, the wireless device determines the wearing status of the cellular capable secondary wireless device by accessing a most recently reported wearing status of the cellular capable secondary wireless device stored at the wireless device or at a network accessible server that is queried by the wireless device.

In some embodiments, an apparatus configurable for operation in a wireless device includes one or more processors and a memory communicatively coupled to the one or more processors, where the one or more processors are configured to execute instructions stored in the memory to cause the wireless device to: (i) receive a page message from a second wireless network associated with a second SIM of the wireless device, the page message indicating a request to establish a mobile terminated connection with the wireless device; (ii) determine a cellular capable secondary wireless device that is paired with the wireless device is not within proximity of the wireless device and a wearing status of the cellular capable secondary wireless device indicates the cellular capable secondary wireless device is being worn; and (iii) provide an indication to the second wireless network to cause the second wireless network to forward the request to establish the mobile terminated connection to a first wireless network associated with a first SIM of the wireless device.

The various aspects, embodiments, implementations or features of the described embodiments can be used separately or in any combination. Further, some aspects of the described embodiments may be implemented by software, hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:
1. A method for adjusting alert notifications at a multiple subscriber identity module (multi-SIM) wireless device, the method comprising:
at the multi-SIM wireless device:
receiving a page message from a first wireless network associated with a first subscriber identity module (SIM) of the multi-SIM wireless device, the page message indicating a request to establish a mobile terminated connection with the multi-SIM wireless device;

determining the page message from the first wireless network comprises a forwarded connection request from a second wireless network associated with a second SIM of the multi-SIM wireless device;

determining a cellular capable secondary wireless device that is paired with the multi-SIM wireless device is not within proximity of the multi-SIM wireless device and a wearing status of the cellular capable secondary wireless device indicates the cellular capable secondary wireless device is being worn; and restricting notification alerts provided via the multi-SIM wireless device responsive to receipt of the page message from the first wireless network.

2. The method of claim 1, wherein the multi-SIM wireless device restricts the notification alerts for the page message from the first wireless network to visual alerts only and suppresses audible alerts.

3. The method of claim 1, wherein the multi-SIM wireless device determines the page message from the first wireless network comprises the forwarded connection request from the second wireless network by at least parsing the page message to examine a field of the page message to determine whether the page message is a forwarded page message.

4. The method of claim 3, wherein:
the page message from the first wireless network comprises a Session Initiation Protocol (SIP) invite message that includes a value indicating the page message is forwarded from the second wireless network, or
the page message includes a supplemental service notification having a field value that indicates the page message is forwarded from the second wireless network.

5. The method of claim 1, wherein the multi-SIM wireless device determines the page message from the first wireless network comprises the forwarded connection request from the second wireless network by at least:
determining a caller identification field value of the page message from the first wireless network and a corresponding caller identification field value of a most recently received page message from the second wireless network match; and
determining the page message from the first wireless network and the most recently received page message from the second wireless network are received within a predetermined time period.

6. A method to establish conditional forwarding between a first subscriber identity module (SIM) and a second SIM of a multiple SIM (multi-SIM) wireless device, the method comprising:
by the multi-SIM wireless device:
detecting pairing of a cellular capable secondary wireless device with the multi-SIM wireless device;
receiving, via a user interface of the multi-SIM wireless device, an indication to receive page messages for mobile terminated connections for both the first SIM and the second SIM on the cellular capable secondary wireless device; and
providing an indication to a network element of a second wireless network associated with the second SIM to forward conditionally page messages and/or short message service (SMS) messages to a first wireless network associated with the first SIM.

7. The method of claim 6, wherein the multi-SIM wireless device comprises:
a removable universal integrated circuit card (UICC) that stores the second SIM; and
an embedded UICC (eUICC) that stores the first SIM as an electronic SIM (eSIM).

8. The method of claim 6, wherein the cellular capable secondary wireless device includes an active electronic SIM (eSIM) that corresponds to the first SIM of the multi-SIM wireless device and is associated with the first wireless network.

9. The method of claim 6, further comprising:
by the multi-SIM wireless device:
providing a notification via the user interface of the multi-SIM wireless device responsive to detecting pairing of the cellular capable secondary wireless device with the multi-SIM wireless device, the notification indicating an option to receive page messages and/or SMS messages at the cellular capable secondary wireless device for the first SIM and the second SIM,
wherein the indication to receive page messages is received via the user interface of the multi-SIM wireless device responsive to the provided notification.

10. The method of claim 6, wherein the indication to receive page messages is received via the user interface through a configuration setting of the multi-SIM wireless device.

11. A wireless device configured to establish conditional forwarding between a first subscriber identity module (SIM) and a second SIM of the wireless device, the wireless device comprising:
wireless circuitry configurable to communicate via a first radio access network of a first wireless network and via a second radio access network of a second wireless network, the wireless circuitry comprising one or more antennas;
one or more processors communicatively coupled to the wireless circuitry; and
a memory communicatively coupled to the one or more processors,
wherein the one or more processors are configured to execute instructions stored in the memory to cause the wireless device to:
detect pairing of a cellular capable secondary wireless device with the wireless device;
receive, via a user interface of the wireless device, an indication to receive page messages for mobile terminated connections for both the first SIM and the second SIM on the cellular capable secondary wireless device; and
provide an indication to a network element of a second wireless network associated with the second SIM to forward conditionally page messages and/or short message service (SMS) messages to a first wireless network associated with the first SIM.

12. The wireless device of claim 11, wherein the wireless device further comprises:
a removable universal integrated circuit card (UICC) that stores the second SIM; and
an embedded UICC (eUICC) that stores the first SIM as an electronic SIM (eSIM).

13. The wireless device of claim 11, wherein the cellular capable secondary wireless device includes an active electronic SIM (eSIM) that corresponds to the first SIM of the wireless device and is associated with the first wireless network.

14. The wireless device of claim 11, wherein execution of the instructions further causes the wireless device to:
provide a notification via the user interface of the wireless device responsive to detecting pairing of the cellular capable secondary wireless device with the wireless device, the notification indicating an option to receive page messages and/or SMS messages at the cellular capable secondary wireless device for the first SIM and the second SIM,
wherein the indication to receive page messages is received via the user interface of the wireless device responsive to the provided notification.

15. The wireless device of claim 11, wherein the indication to receive page messages is received via the user interface through a configuration setting of the wireless device.

16. An apparatus configurable for operation in a wireless device, the apparatus comprising:
one or more processors; and
a memory communicatively coupled to the one or more processors,
wherein the one or more processors are configured to execute instructions stored in the memory to cause the wireless device to:
detect pairing of a cellular capable secondary wireless device with the wireless device;
receive, via a user interface of the wireless device, an indication to receive page messages for mobile terminated connections for both a first subscriber identity module (SIM) and a second SIM on the cellular capable secondary wireless device; and
provide an indication to a network element of a second wireless network associated with the second SIM to forward conditionally page messages and/or short message service (SMS) messages to a first wireless network associated with the first SIM.

17. The apparatus of claim 16, wherein the apparatus further comprises:
a removable universal integrated circuit card (UICC) that stores the second SIM; and
an embedded UICC (eUICC) that stores the first SIM as an electronic SIM (eSIM).

18. The apparatus of claim 16, wherein the cellular capable secondary wireless device includes an active electronic SIM (eSIM) that corresponds to the first SIM of the wireless device and is associated with the first wireless network.

19. The apparatus of claim 16, wherein execution of the instructions further causes the wireless device to:
provide a notification via the user interface of the wireless device responsive to detecting pairing of the cellular capable secondary wireless device with the wireless device, the notification indicating an option to receive page messages and/or SMS messages at the cellular capable secondary wireless device for the first SIM and the second SIM,
wherein the indication to receive page messages is received via the user interface of the wireless device responsive to the provided notification.

20. The apparatus of claim 16, wherein the indication to receive page messages is received via the user interface through a configuration setting of the wireless device.

* * * * *